(12) United States Patent
Rosewarne et al.

(10) Patent No.: US 9,813,715 B2
(45) Date of Patent: Nov. 7, 2017

(54) METHOD, APPARATUS AND SYSTEM FOR ENCODING AND DECODING VIDEO DATA

(71) Applicant: CANON KABUSHIKI KAISHA, Tokyo (JP)

(72) Inventors: Christopher James Rosewarne, Gosford (AU); Volodymyr Kolesnikov, Marsfield (AU)

(73) Assignee: Canon Kabushiki Kaisha, Tokyo (JP)

( * ) Notice: Subject to any disclaimer, the term of this patent is extended or adjusted under 35 U.S.C. 154(b) by 217 days.

(21) Appl. No.: 14/326,266

(22) Filed: Jul. 8, 2014

(65) Prior Publication Data

US 2015/0016542 A1 Jan. 15, 2015

(30) Foreign Application Priority Data

Jul. 11, 2013 (AU) .................................. 2013206815

(51) Int. Cl.
*H04N 19/44* (2014.01)
*H04N 19/176* (2014.01)
*H04N 19/126* (2014.01)
*H04N 19/136* (2014.01)
*H04N 19/98* (2014.01)

(52) U.S. Cl.
CPC ......... *H04N 19/176* (2014.11); *H04N 19/126* (2014.11); *H04N 19/136* (2014.11); *H04N 19/44* (2014.11); *H04N 19/98* (2014.11)

(58) Field of Classification Search
CPC .... H04N 19/176; H04N 19/126; H04N 19/98; H04N 19/44
USPC .................................................... 375/240.25
See application file for complete search history.

(56) References Cited

U.S. PATENT DOCUMENTS

| 2012/0307889 | A1 | 12/2012 | Kerofsky et al. | |
| 2013/0114728 | A1 | 5/2013 | Kerofsky et al. | |
| 2014/0112383 | A1* | 4/2014 | Yang ...................... | H04N 19/40 375/240.01 |

FOREIGN PATENT DOCUMENTS

WO 2013/002619 A2 1/2013

OTHER PUBLICATIONS

David Flynn, Matteo Naccari, "High Efficiency Video Coding (HEVC) Range Extensions text specification: Draft 7", Apr. 4, 2014, JCT-VC.*

(Continued)

*Primary Examiner* — Nguyen Truong
(74) *Attorney, Agent, or Firm* — Canon USA, Inc. I.P. Division

(57) ABSTRACT

A method of decoding a bit-stream of encoded video data in a video decoder is disclosed. The method determines if the bit-stream of encoded video data has extended precision processing enabled and has a bit-depth greater than nine bits, when a profile of the bit-stream of the encoded video data is determined to be unsupported by the video decoder. The bit-stream of the encoded video data is decoded to determine decoded video data, using a profile supported by the video decoder, if the bit stream has extended precision processing enabled and a bit depth greater than nine (9) bits. The decoded video data has differences to the video data encoded in the bit-stream due to the unsupported profile being different to the supported profile.

10 Claims, 12 Drawing Sheets

(56) References Cited

OTHER PUBLICATIONS

Fuldseth, et al., "CE10: Core transform design for HEVC", Joint Collaborative Team on Video Coding (JCT-VC) of ITU-T SG16 WP3 and ISO/IEC JTC 1/SC 29/WG11, 7th Meeting: Geneva, CH, Nov. 21-30, 2011, pp. 1-10.
Sharman, et al., "AHG5: Range Extensions and High Bit Depths", Joint Collaborative Team on Video Coding (JCT-VC) of ITU-T SG16 WP3 and ISO/IEC JTC 1/SC 29/WG11, 13th Meeting: Incheon, KR, Apr. 18-26, 2013, pp. 1-21.
IP Australia Patent Examination Report No. 2, dated Dec. 23, 2015, re application No: 2013206815, pp. 1-3.

* cited by examiner

METHOD, APPARATUS AND SYSTEM FOR ENCODING AND DECODING VIDEO DATA

REFERENCE TO RELATED PATENT APPLICATION

This application claims the benefit under 35 U.S.C. §119 of the filing date of Australian Patent Application No. 2013206815, filed 11 Jul. 2013, hereby incorporated by reference in its entirety as if fully set forth herein.

TECHNICAL FIELD

The present invention relates generally to digital video signal processing and, in particular, to a method, apparatus and system for encoding and decoding video data. The present invention also relates to a computer program product including a computer readable medium having recorded thereon a computer program for encoding and decoding video data.

BACKGROUND

Many applications for video coding currently exist, including applications for transmission and storage of video data. Many video coding standards have also been developed and others are currently in development. Recent developments in video coding standardisation have led to the formation of a group called the "Joint Collaborative Team on Video Coding" (JCT-VC). The Joint Collaborative Team on Video Coding (JCT-VC) includes members of Study Group 16, Question 6 (SG16/Q6) of the Telecommunication Standardisation Sector (ITU-T) of the International Telecommunication Union (ITU), known as the Video Coding Experts Group (VCEG), and members of the International Organisations for Standardisation/International Electrotechnical Commission Joint Technical Committee 1/Subcommittee 29/Working Group 11 (ISO/IEC JTC1/SC29/WG11), also known as the Moving Picture Experts Group (MPEG).

The Joint Collaborative Team on Video Coding (JCT-VC) has produced a new video coding standard that significantly outperforms the "H.264/MPEG-4 AVC" video coding standard. The new video coding standard has been named "high efficiency video coding (HEVC)". Further development of high efficiency video coding (HEVC) is directed towards introducing support of different representations of chroma information present in video data, known as 'chroma formats', and support of higher bit-depths. The high efficiency video coding (HEVC) standard defines two profiles, known as 'Main' and 'Main10', which support a bit-depth of eight (8) bits and ten (10) bits respectively. Further development to increase the bit-depths supported by the high efficiency video coding (HEVC) standard are underway as part of 'Range extensions' activity. Support for bit-depths as high as sixteen (16) bits is under study in the Joint Collaborative Team on Video Coding (JCT-VC).

Video data includes one or more colour channels. Typically three colour channels are supported and colour information is represented using a 'colour space'. One example colour space is known as 'YCbCr', although other colour spaces are also possible. The 'YCbCr' colour space enables fixed-precision representation of colour information and thus is well suited to digital implementations. The 'YCbCr' colour space includes a 'luma' channel (Y) and two 'chroma' channels (Cb and Cr). Each colour channel has a particular bit-depth. The bit-depth defines the width of samples in the respective colour channel in bits. Generally, all colour channels have the same bit-depth, although they may also have different bit-depths.

One aspect of the coding efficiency achievable with a particular video coding standard is the characteristics of available prediction methods. For video coding standards intended for compression sequences of two-dimensional video frames, there are two types of prediction: intra-prediction and inter-prediction. Intra-prediction methods allow content of one part of a video frame to be predicted from other parts of the same video frame. Intra-prediction methods typically produce a block having a directional texture, with an intra-prediction mode specifying the direction of the texture and neighbouring samples within a frame used as a basis to produce the texture. Inter-prediction methods allow the content of a block within a video frame to be predicted from blocks in previous video frames. The previous video frames may be referred to as 'reference frames'. The first video frame within a sequence of video frames typically uses intra-prediction for all blocks within the frame, as no prior frame is available for reference. Subsequent video frames may use one or more previous video frames from which to predict blocks. To achieve the highest coding efficiency, the prediction method that produces a predicted block that is closest to captured frame data is typically used. The remaining difference between the predicted block and the captured frame data is known as the 'residual'. This spatial domain representation of the difference is generally transformed into a frequency domain representation. Generally, the frequency domain representation compactly stores the information present in the spatial domain representation. The frequency domain representation includes a block of 'residual coefficients' that results from applying a transform, such as an integer discrete cosine transform (DCT). Moreover, the residual coefficients (or 'scaled transform coefficients') are quantised, which introduces loss but also further reduces the amount of information required to be encoded in a bitstream. The lossy frequency domain representation of the residual, also known as 'transform coefficients', may be stored in the bitstream. The amount of lossiness in the residual recovered in a decoder affects the distortion of video data decoded from the bitstream compared to the captured frame data and the size of the bitstream.

The logic complexity of the transform and the quantiser logic is dependent on factors including the binary width of internal signals (or 'busses'). Support for higher bit-depths generally requires increasing the width of internal busses. For a given bit-depth, a particular set of 'extreme' input data exists that must be supported by video encoders and video decoders. This condition is generally referred to as a 'worst case' condition. Such extreme input data, although rarely encountered in practice, is theoretically possible and for a video decoder to claim 'conformance' such cases must be correctly processed.

Generally, video coding standards define the required (i.e. 'normative') behaviour of a video decoder. From this required behaviour, the architecture of a video encoder may also be inferred. Although a video encoder may be expected to operate within certain limits, it is possible for bitstreams to exist that, while within the normative scope of the video coding standard, exhibit extremes of behaviour that may place unreasonable burden upon implementations of a video decoder. To some extent, such burden can be alleviated by introducing additional restrictions beyond the normative scope of the video coding standard. Such restrictions are considered 'non-normative' and may include clipping operations. Non-normative clipping operations would not generally have any affect when decoding bitstreams produced by a video encoder. However, the non-normative clipping operations may come into effect when decoding extreme input data, sometimes referred to as 'evil' bitstreams.

A quantiser is said to have a 'step size' that is controlled via a 'quantisation parameter' (or 'QP'). The step size defines the ratio between the values output by the transform and the values encoded in a bitstream. At higher quantisation parameter values, the step size is larger, resulting in higher compression. The quantisation parameter may be fixed, or may be adaptively updated based on some quality or bit-rate criteria. Extreme cases of residual coefficient magnitude, resulting from a transform and quantisation parameter, define a 'worst case' for residual coefficients to be encoded and decoded from a bitstream. When encoding frame data at a high bit-depths (e.g., 16-bits), it is desirable for a video decoder to reproduce a very close approximation of the frame data. For example, if a large quantiser step size were used for 16-bit data, performance would be similar to using a lower bit-depth in the video encoder and the video decoder. Consequently, high peak signal to noise ratio (PSNR) values are desirable. As such, very low or even negative values for the quantisation parameter may be expected when the bit-depth is 16-bits. Modules within the video encoder and the video decoder separate the quantisation parameter into two portions, a 'period' (or 'QP_per') and a 'remainder' (or 'QP_rem'). The remainder is the result of a modulo six of the quantisation parameter and the period is the result of an integer division by six of the quantisation parameter. The behaviour of these operations, including at negative quantisation parameters, is exemplified in the Table 1, below:

TABLE 1

| QP | ... | −8 | −7 | −6 | −5 | −4 | −3 | −2 | −1 | 0 | 1 | 2 | 3 | 4 | 5 | 6 | 7 | ... |
|---|---|---|---|---|---|---|---|---|---|---|---|---|---|---|---|---|---|---|
| QP_per | ... | −2 | −2 | −1 | −1 | −1 | −1 | −1 | −1 | 0 | 0 | 0 | 0 | 0 | 0 | 1 | 1 | ... |
| QP_rem | ... | 4 | 5 | 0 | 1 | 2 | 3 | 4 | 5 | 0 | 1 | 2 | 3 | 4 | 5 | 0 | 1 | ... |

SUMMARY

It is an object of the present invention to substantially overcome, or at least ameliorate, one or more disadvantages of existing arrangements.

According to one aspect of the present disclosure, there is provided a method of decoding a video bitstream to produce a residual sample array, the method comprising:

decoding transform coefficients from the video bitstream using an entropy decoder;

determining a dequantiser gain according to at least one of a transform size, a bit-depth, a precision value, a range value and a quantisation parameter;

determining a clipped dequantiser gain from the determined dequantiser gain, wherein the dequantiser gain is clipped based on a predetermined threshold;

dequantising the transform coefficients according to the determined clipped dequantiser gain to produce scaled transform coefficients, the scaled transform coefficients having a first dynamic range and the transform coefficients 450 having a second dynamic range, wherein the second dynamic range is less than or equal to the first dynamic range;

inverse transforming the scaled transform coefficients to produce the residual sample array.

According to another aspect of the present disclosure, there is provided a method of encoding transform coefficients of video data into a video bitstream, the method comprising:

transforming a residual sample array into scaled transform coefficients, the scaled transform coefficients having a first dynamic range;

determining a quantiser gain according to at least one of a transform size, a bit-depth, a range value and a quantisation parameter; determining a clipped quantiser gain from the determined quantiser gain based on a predetermined threshold;

quantising the scaled transform coefficients according to the determined clipped quantiser gain to produce transform coefficients having a second dynamic range, wherein the second dynamic range is less than or equal to the first dynamic range; and encoding the transform coefficients into the video bitstream using an entropy encoder.

According to still another aspect of the present disclosure, there is provided a system for decoding a video bitstream to produce a residual sample array, the system comprising:

a memory for storing data and a computer program;

a processor coupled to the memory for executing said computer program, said computer program being configured for:

decoding transform coefficients from the video bitstream using an entropy decoder;

determining a dequantiser gain according to at least one of a transform size, a bit-depth, a precision value, a range value and a quantisation parameter;

determining a clipped dequantiser gain from the determined dequantiser gain, wherein the dequantiser gain is clipped based on a predetermined threshold;

dequantising the transform coefficients according to the determined clipped dequantiser gain to produce scaled transform coefficients, the scaled transform coefficients having a first dynamic range and the transform coefficients having a second dynamic range, wherein the second dynamic range is less than or equal to the first dynamic range;

inverse transforming the scaled transform coefficients to produce the residual sample array.

According to still another aspect of the present disclosure, there is provided an apparatus for decoding a video bitstream to produce a residual sample array, the apparatus comprising:

means for decoding transform coefficients from the video bitstream using an entropy decoder;

means for determining a dequantiser gain according to at least one of a transform size, a bit-depth, a precision value, a range value and a quantisation parameter;

means for determining a clipped dequantiser gain from the determined dequantiser gain, wherein the dequantiser gain is clipped based on a predetermined threshold;

means for dequantising the transform coefficients according to the determined clipped dequantiser gain to produce scaled transform coefficients, the scaled transform coefficients having a first dynamic range and the transform coefficients 450 having a second dynamic range, wherein the second dynamic range is less than or equal to the first dynamic range;

means for inverse transforming the scaled transform coefficients to produce the residual sample array.

According to still another aspect of the present disclosure, there is provided a computer readable medium, having a program recorded thereon, where the program is configured to make a computer execute a procedure to decode a video bitstream to produce a residual sample array, the program comprising:

code for decoding transform coefficients from the video bitstream using an entropy decoder;

code for determining a dequantiser gain according to at least one of a transform size, a bit-depth, a precision value, a range value and a quantisation parameter;

code for determining a clipped dequantiser gain from the determined dequantiser gain, wherein the dequantiser gain is clipped based on a predetermined threshold;

code for dequantising the transform coefficients according to the determined clipped dequantiser gain to produce scaled transform coefficients, the scaled transform coefficients having a first dynamic range and the transform coefficients having a second dynamic range, wherein the second dynamic range is less than or equal to the first dynamic range;

code for inverse transforming the scaled transform coefficients to produce the residual sample array.

According to still another aspect of the present disclosure, there is provided a system for encoding transform coefficients of video data into a video bitstream, the system comprising:

a memory for storing data and a computer program;

a processor coupled to the memory for executing said computer program, said computer program being configured for:

transforming a residual sample array into scaled transform coefficients, the scaled transform coefficients having a first dynamic range;

determining a quantiser gain according to at least one of a transform size, a bit-depth, a range value and a quantisation parameter;

determining a clipped quantiser gain from the determined quantiser gain based on a predetermined threshold;

quantising the scaled transform coefficients according to the determined clipped quantiser gain to produce transform coefficients having a second dynamic range, wherein the second dynamic range is less than or equal to the first dynamic range; and encoding the transform coefficients into the video bitstream using an entropy encoder.

According to still another aspect of the present disclosure, there is provided an apparatus for encoding transform coefficients of video data into a video bitstream, the apparatus comprising:

means for transforming a residual sample array into scaled transform coefficients, the scaled transform coefficients having a first dynamic range;

means for determining a quantiser gain according to at least one of a transform size, a bit-depth, a range value and a quantisation parameter;

means for determining a clipped quantiser gain from the determined quantiser gain based on a predetermined threshold;

means for quantising the scaled transform coefficients according to the determined clipped quantiser gain to produce transform coefficients having a second dynamic range, wherein the second dynamic range is less than or equal to the first dynamic range; and means for encoding the transform coefficients into the video bitstream using an entropy encoder.

According to still another aspect of the present disclosure, there is provided a computer readable medium, having a program recorded thereon, where the program is configured to make a computer execute a procedure to encode transform coefficients of video data into a video bitstream, the program comprising:

code for transforming a residual sample array into scaled transform coefficients, the scaled transform coefficients having a first dynamic range;

code for determining a quantiser gain according to at least one of a transform size, a bit-depth, a range value and a quantisation parameter;

code for determining a clipped quantiser gain from the determined quantiser gain based on a predetermined threshold;

code for quantising the scaled transform coefficients according to the determined clipped quantiser gain to produce transform coefficients having a second dynamic range, wherein the second dynamic range is less than or equal to the first dynamic range; and code for encoding the transform coefficients into the video bitstream using an entropy encoder.

Other aspects are also disclosed.

BRIEF DESCRIPTION OF THE DRAWINGS

At least one embodiment of the present invention will now be described with reference to the following drawings and appendices, in which.

Figure 10:
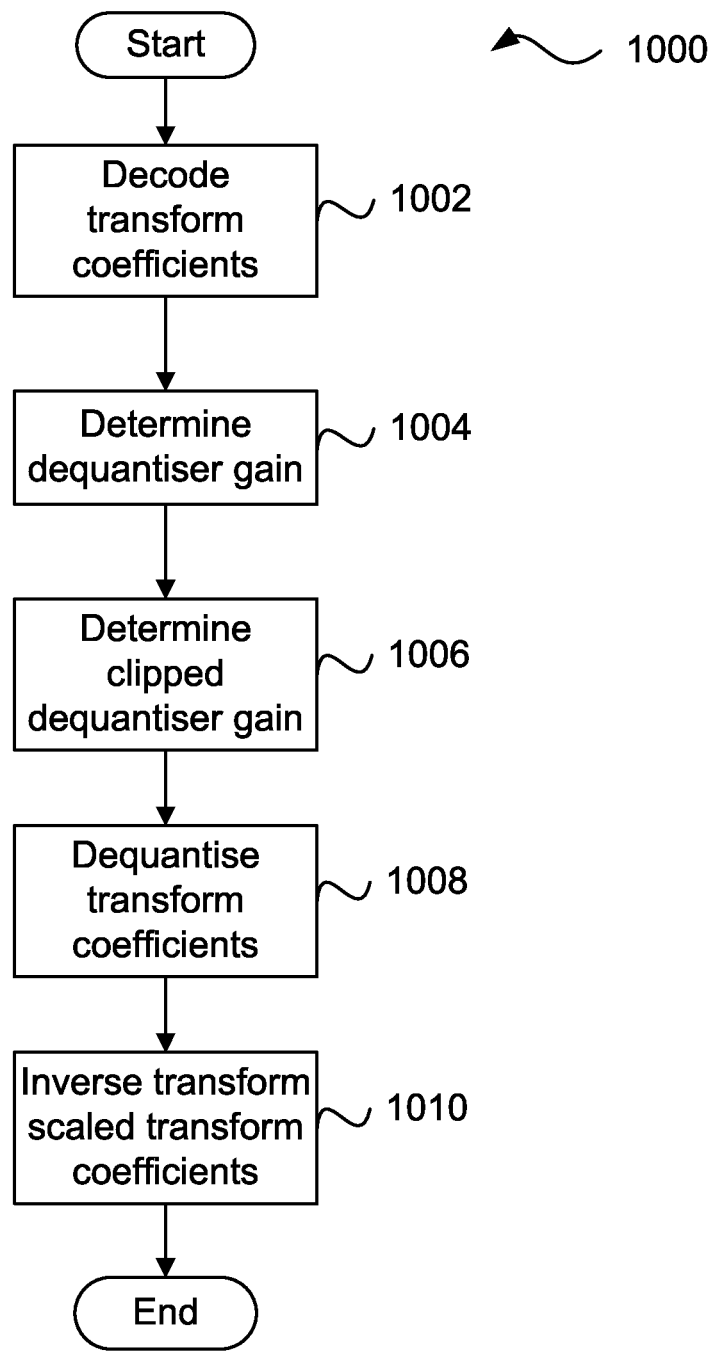
FIG. 10 is a schematic flow diagram showing a method of decoding an encoded video bitstream using the video decoder of FIG. 4.

Appendix A shows an example of a transform matrix according to the high efficiency video coding (HEVC) standard;

Appendix B shows an example of a transform matrix having increased precision;

Appendix C shows an example of the method of dequantising transform coefficients in accordance with the method of FIG. 10; and Appendix D shows a further example of the method of dequantising transform coefficients in accordance with the method of FIG. 10.

DETAILED DESCRIPTION INCLUDING BEST MODE

Where reference is made in any one or more of the accompanying drawings to steps and/or features, which have the same reference numerals, those steps and/or features have for the purposes of this description the same function(s) or operation(s), unless the contrary intention appears.

Figure 1:
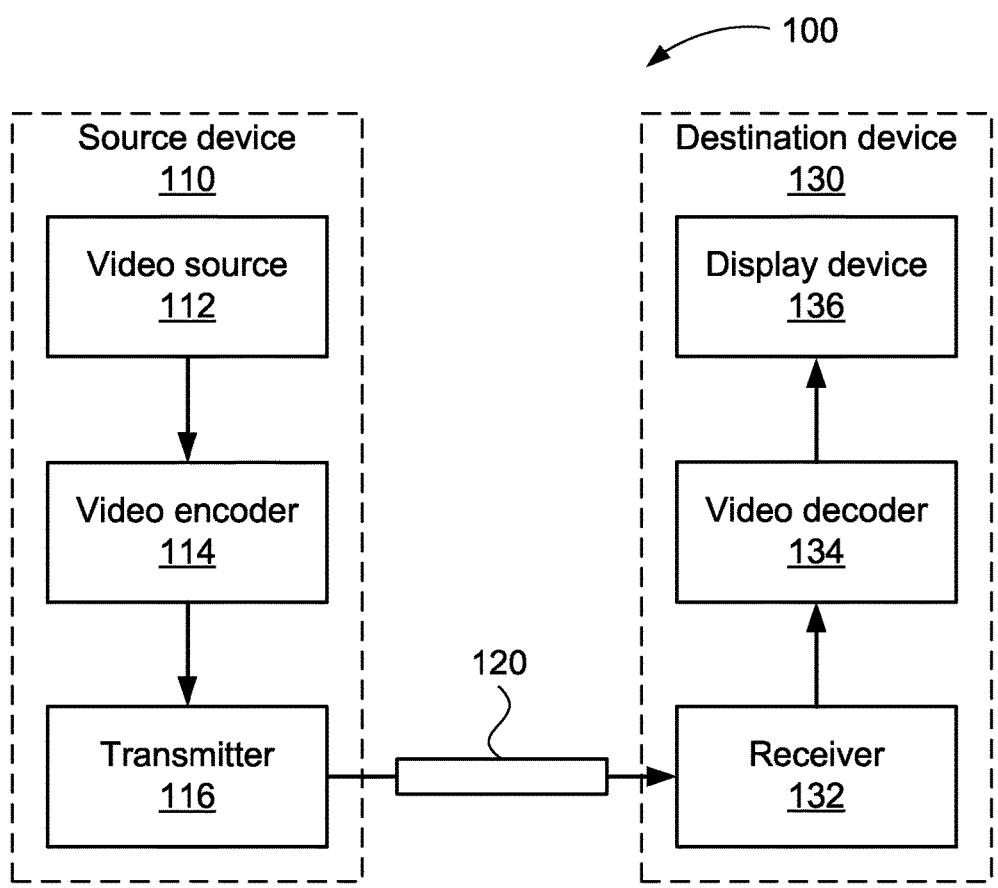
FIG. 1 is a schematic block diagram showing a video encoding and decoding system.

FIG. 1 is a schematic block diagram showing function modules of a video encoding and decoding system 100. The system 100 may utilise techniques for quantising and dequantising transform coefficients that result in an improved coding efficiency at very high bit-rates (i.e. very low quantisation parameter values). The system 100 includes a source device 110 and a destination device 130. A communication channel 120 is used to communicate encoded video information from the source device 110 to the destination device 130. In some arrangements, the source device 110 and destination device 130 may comprise respective mobile telephone hand-sets, in which case the communication channel 120 is a wireless channel. In other arrangements, the source device 110 and destination device 130 may comprise video conferencing equipment, in which case the communication channel 120 is typically a wired channel, such as an internet connection. Moreover, the source device 110 and the destination device 130 may comprise any of a wide range of devices, including devices supporting over the air television broadcasts, cable television applications, internet video applications and applications where encoded video data is captured on some storage medium or a file server.

As shown in FIG. 1, the source device 110 includes a video source 112, a video encoder 114 and a transmitter 116. The video source 112 typically comprises a source of captured video frame data, such as an imaging sensor, a previously captured video sequence stored on a non-transitory recording medium, or a video feed from a remote imaging sensor. Examples of source devices 110 that may include an imaging sensor as the video source 112 include smart-phones, video camcorders and network video cameras. The video encoder 114 converts the captured frame data from the video source 112 into encoded video data and will be described further with reference to FIG. 3. The encoded video data is typically transmitted by the transmitter 116 over the communication channel 120 as encoded video data (or "encoded video information"). It is also possible for the encoded video data to be stored in some storage device, such as a "Flash" memory or a hard disk drive, until later being transmitted over the communication channel 120.

The destination device 130 includes a receiver 132, a video decoder 134 and a display device 136. The receiver 132 receives encoded video data from the communication channel 120 and passes received video data to the video decoder 134. The video decoder 134 then outputs decoded frame data to the display device 136. Examples of the display device 136 include a cathode ray tube, a liquid crystal display, such as in smart-phones, tablet computers, computer monitors or in stand-alone television sets. It is also possible for the functionality of each of the source device 110 and the destination device 130 to be embodied in a single device.

Figure 2A:
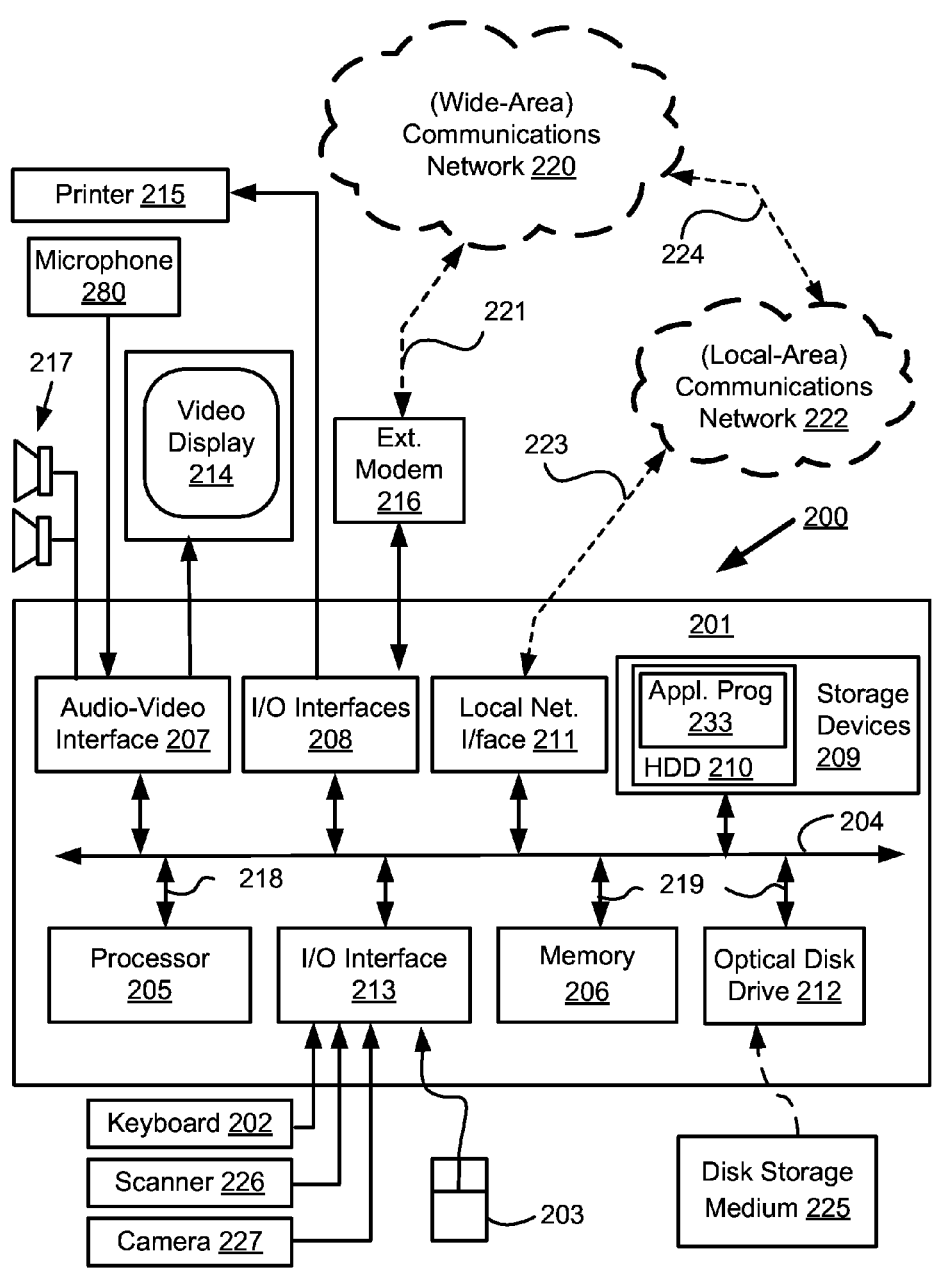
FIGS. 2A and 2B form a schematic block diagram of a general purpose computer system upon which one or both of the video encoding and decoding system of FIG. 1 may be practiced.

Notwithstanding the example devices mentioned above, each of the source device 110 and destination device 130 may be configured within a general purpose computing system, typically through a combination of hardware and software components. FIG. 2A illustrates such a computer system 200, which includes: a computer module 201; input devices such as a keyboard 202, a mouse pointer device 203, a scanner 226, a camera 227, which may be configured as the video source 112, and a microphone 280; and output devices including a printer 215, a display device 214, which may be configured as the display device 136, and loudspeakers 217. An external Modulator-Demodulator (Modem) transceiver device 216 may be used by the computer module 201 for communicating to and from a communications network 220 via a connection 221. The communications network 220, which may represent the communication channel 120, may be a wide-area network (WAN), such as the Internet, a cellular telecommunications network, or a private WAN. Where the connection 221 is a telephone line, the modem 216 may be a traditional "dial-up" modem. Alternatively, where the connection 221 is a high capacity (e.g., cable) connection, the modem 216 may be a broadband modem. A wireless modem may also be used for wireless connection to the communications network 220. The transceiver device 216 may provide the functionality of the transmitter 116 and the receiver 132 and the communication channel 120 may be embodied in the connection 221.

The computer module 201 typically includes at least one processor unit 205, and a memory unit 206. For example, the memory unit 206 may have semiconductor random access memory (RAM) and semiconductor read only memory (ROM). The computer module 201 also includes an number of input/output (I/O) interfaces including: an audio-video interface 207 that couples to the video display 214, loudspeakers 217 and microphone 280; an I/O interface 213 that couples to the keyboard 202, mouse 203, scanner 226, camera 227 and optionally a joystick or other human interface device (not illustrated); and an interface 208 for the external modem 216 and printer 215. In some implementations, the modem 216 may be incorporated within the computer module 201, for example within the interface 208. The computer module 201 also has a local network interface 211, which permits coupling of the computer system 200 via a connection 223 to a local-area communications network 222, known as a Local Area Network (LAN). As illustrated in FIG. 2A, the local communications network 222 may also couple to the wide network 220 via a connection 224, which would typically include a so-called "firewall" device or device of similar functionality. The local network interface 211 may comprise an Ethernet™ circuit card, a Bluetooth™ wireless arrangement or an IEEE 802.11 wireless arrangement; however, numerous other types of interfaces may be practiced for the interface 211. The local network interface 211 may also provide the functionality of the transmitter 116 and the receiver 132 and communication channel 120 may also be embodied in the local communications network 222.

The I/O interfaces 208 and 213 may afford either or both of serial and parallel connectivity, the former typically being implemented according to the Universal Serial Bus (USB) standards and having corresponding USB connectors (not illustrated). Storage devices 209 are provided and typically include a hard disk drive (HDD) 210. Other storage devices such as a floppy disk drive and a magnetic tape drive (not illustrated) may also be used. An optical disk drive 212 is typically provided to act as a non-volatile source of data. Portable memory devices, such optical disks (e.g. CD-ROM, DVD, Blu-ray Disc™), USB-RAM, portable, external hard drives, and floppy disks, for example, may be used as appropriate sources of data to the computer system 200. Typically, any of the HDD 210, optical drive 212, networks 220 and 222 may also be configured to operate as the video source 112, or as a destination for decoded video data to be stored for reproduction via the display 214.

The components 205 to 213 of the computer module 201 typically communicate via an interconnected bus 204 and in a manner that results in a conventional mode of operation of the computer system 200 known to those in the relevant art. For example, the processor 205 is coupled to the system bus 204 using a connection 218. Likewise, the memory 206 and optical disk drive 212 are coupled to the system bus 204 by connections 219. Examples of computers on which the described arrangements can be practised include IBM-PC's and compatibles, Sun SPARCstations, Apple Mac™ or alike computer systems.

Where appropriate or desired, the video encoder 114 and the video decoder 134, as well as methods described below, may be implemented using the computer system 200 wherein the video encoder 114, the video decoder 134 and the methods of FIGS. 9 and 10, to be described, may be implemented as one or more software application programs 233 executable within the computer system 200. In particular, the video encoder 114, the video decoder 134 and the steps of the described methods are effected by instructions 231 (see FIG. 2B) in the software 233 that are carried out within the computer system 200. The software instructions 231 may be formed as one or more code modules, each for performing one or more particular tasks. The software may also be divided into two separate parts, in which a first part and the corresponding code modules performs the described methods and a second part and the corresponding code modules manage a user interface between the first part and the user.

The software may be stored in a computer readable medium, including the storage devices described below, for example. The software is loaded into the computer system 200 from the computer readable medium, and then executed by the computer system 200. A computer readable medium having such software or computer program recorded on the computer readable medium is a computer program product. The use of the computer program product in the computer system 200 preferably effects an advantageous apparatus for implementing the video encoder 114, the video decoder 134 and the described methods.

The software 233 is typically stored in the HDD 210 or the memory 206. The software is loaded into the computer system 200 from a computer readable medium, and executed by the computer system 200. Thus, for example, the software 233 may be stored on an optically readable disk storage medium (e.g., CD-ROM) 225 that is read by the optical disk drive 212.

In some instances, the application programs 233 may be supplied to the user encoded on one or more CD-ROMs 225 and read via the corresponding drive 212, or alternatively may be read by the user from the networks 220 or 222. Still further, the software can also be loaded into the computer system 200 from other computer readable media. Computer readable storage media refers to any non-transitory tangible storage medium that provides recorded instructions and/or data to the computer system 200 for execution and/or processing. Examples of such storage media include floppy disks, magnetic tape, CD-ROM, DVD, Blu-ray Disc, a hard disk drive, a ROM or integrated circuit, USB memory, a magneto-optical disk, or a computer readable card such as a PCMCIA card and the like, whether or not such devices are internal or external of the computer module 201. Examples of transitory or non-tangible computer readable transmission media that may also participate in the provision of the software, application programs, instructions and/or video data or encoded video data to the computer module 401 include radio or infra-red transmission channels as well as a network connection to another computer or networked device, and the Internet or Intranets including e-mail transmissions and information recorded on Websites and the like.

The second part of the application programs 233 and the corresponding code modules mentioned above may be executed to implement one or more graphical user interfaces (GUIs) to be rendered or otherwise represented upon the display 214. Through manipulation of typically the keyboard 202 and the mouse 203, a user of the computer system 200 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 217 and user voice commands input via the microphone 280.

Figure 2B:
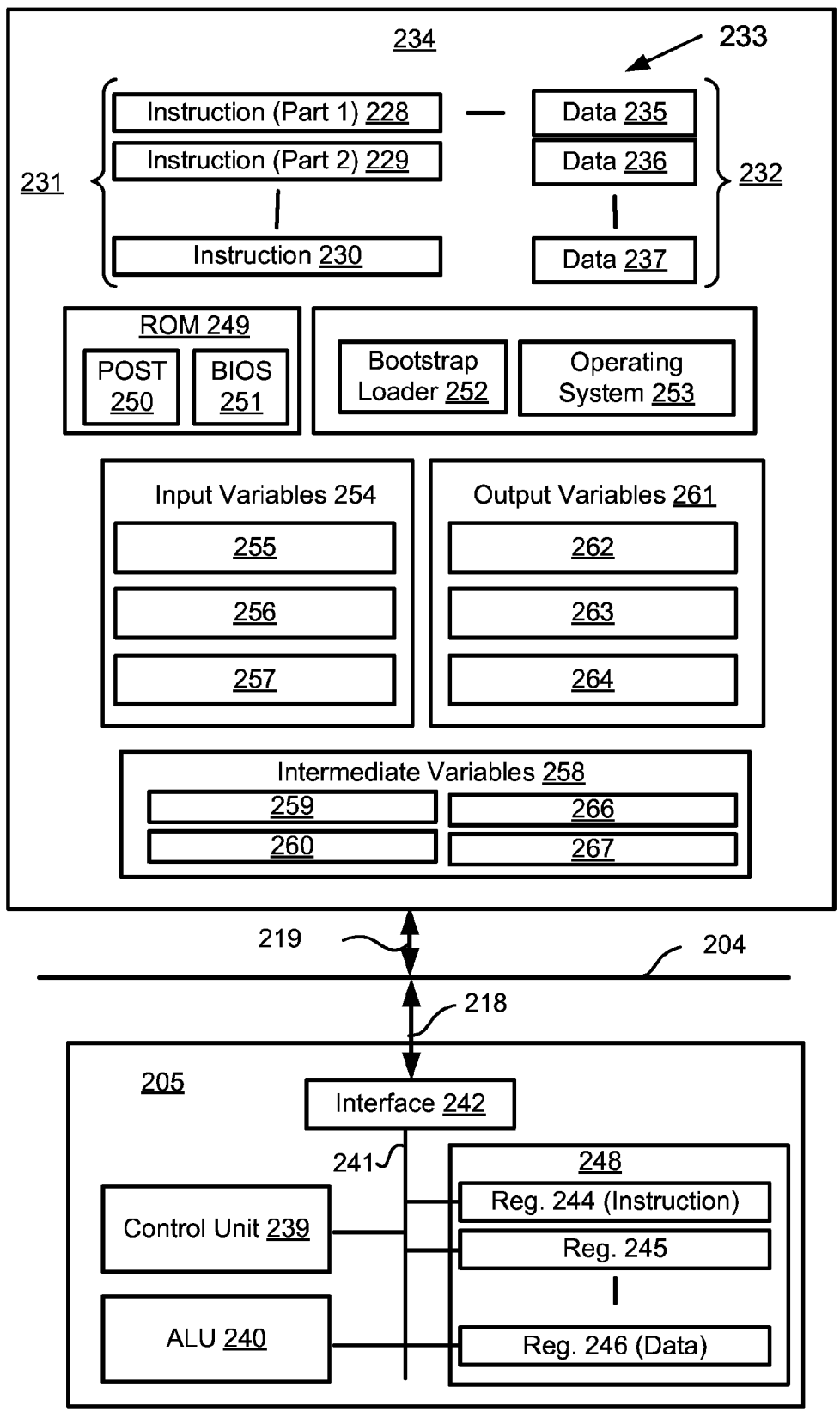

FIG. 2B is a detailed schematic block diagram of the processor 205 and a "memory" 234. The memory 234 represents a logical aggregation of all the memory modules (including the HDD 209 and semiconductor memory 206) that can be accessed by the computer module 201 in FIG. 2A.

When the computer module 201 is initially powered up, a power-on self-test (POST) program 250 executes. The POST program 250 is typically stored in a ROM 249 of the semiconductor memory 206 of FIG. 2A. A hardware device such as the ROM 249 storing software is sometimes referred to as firmware. The POST program 250 examines hardware within the computer module 201 to ensure proper functioning and typically checks the processor 205, the memory 234 (209, 206), and a basic input-output systems software (BIOS) module 251, also typically stored in the ROM 249, for correct operation. Once the POST program 250 has run successfully, the BIOS 251 activates the hard disk drive 210 of FIG. 2A. Activation of the hard disk drive 210 causes a bootstrap loader program 252 that is resident on the hard disk drive 210 to execute via the processor 205. This loads an operating system 253 into the RAM memory 206, upon which the operating system 253 commences operation. The operating system 253 is a system level application, executable by the processor 205, to fulfill various high level functions, including processor management, memory management, device management, storage management, software application interface, and generic user interface.

The operating system 253 manages the memory 234 (209, 206) to ensure that each process or application running on the computer module 201 has sufficient memory in which to execute without colliding with memory allocated to another process. Furthermore, the different types of memory available in the computer system 200 of FIG. 2A must be used properly so that each process can run effectively. Accordingly, the aggregated memory 234 is not intended to illustrate how particular segments of memory are allocated (unless otherwise stated), but rather to provide a general view of the memory accessible by the computer system 200 and how such is used.

As shown in FIG. 2B, the processor 205 includes a number of functional modules including a control unit 239, an arithmetic logic unit (ALU) 240, and a local or internal memory 248, sometimes called a cache memory. The cache memory 248 typically includes a number of storage registers 244-246 in a register section. One or more internal busses 241 functionally interconnect these functional modules. The processor 205 typically also has one or more interfaces 242 for communicating with external devices via the system bus 204, using a connection 218. The memory 234 is coupled to the bus 204 using a connection 219.

The application program 233 includes a sequence of instructions 231 that may include conditional branch and loop instructions. The program 233 may also include data 232 which is used in execution of the program 233. The instructions 231 and the data 232 are stored in memory locations 228, 229, 230 and 235, 236, 237, respectively. Depending upon the relative size of the instructions 231 and the memory locations 228-230, a particular instruction may be stored in a single memory location as depicted by the instruction shown in the memory location 230. Alternately, an instruction may be segmented into a number of parts each of which is stored in a separate memory location, as depicted by the instruction segments shown in the memory locations 228 and 229.

In general, the processor 205 is given a set of instructions which are executed therein. The processor 205 waits for a subsequent input, to which the processor 205 reacts to by executing another set of instructions. Each input may be provided from one or more of a number of sources, including data generated by one or more of the input devices 202, 203, data received from an external source across one of the networks 220, 202, data retrieved from one of the storage devices 206, 209 or data retrieved from a storage medium 225 inserted into the corresponding reader 212, all depicted in FIG. 2A. The execution of a set of the instructions may in some cases result in output of data. Execution may also involve storing data or variables to the memory 234.

The video encoder 114, the video decoder 134 and the described methods may use input variables 254, which are stored in the memory 234 in corresponding memory locations 255, 256, 257. The video encoder 114, the video decoder 134 and the described methods produce output variables 261, which are stored in the memory 234 in corresponding memory locations 262, 263, 264. Intermediate variables 258 may be stored in memory locations 259, 260, 266 and 267.

Referring to the processor 205 of FIG. 2B, the registers 244, 245, 246, the arithmetic logic unit (ALU) 240, and the control unit 239 work together to perform sequences of micro-operations needed to perform "fetch, decode, and execute" cycles for every instruction in the instruction set making up the program 233. Each fetch, decode, and execute cycle comprises:

(a) a fetch operation, which fetches or reads an instruction 231 from a memory location 228, 229, 230;

(b) a decode operation in which the control unit 239 determines which instruction has been fetched; and (c) an execute operation in which the control unit 239 and/or the ALU 240 execute the instruction.

Thereafter, a further fetch, decode, and execute cycle for the next instruction may be executed. Similarly, a store cycle may be performed by which the control unit 239 stores or writes a value to a memory location 232.

Figure 9:
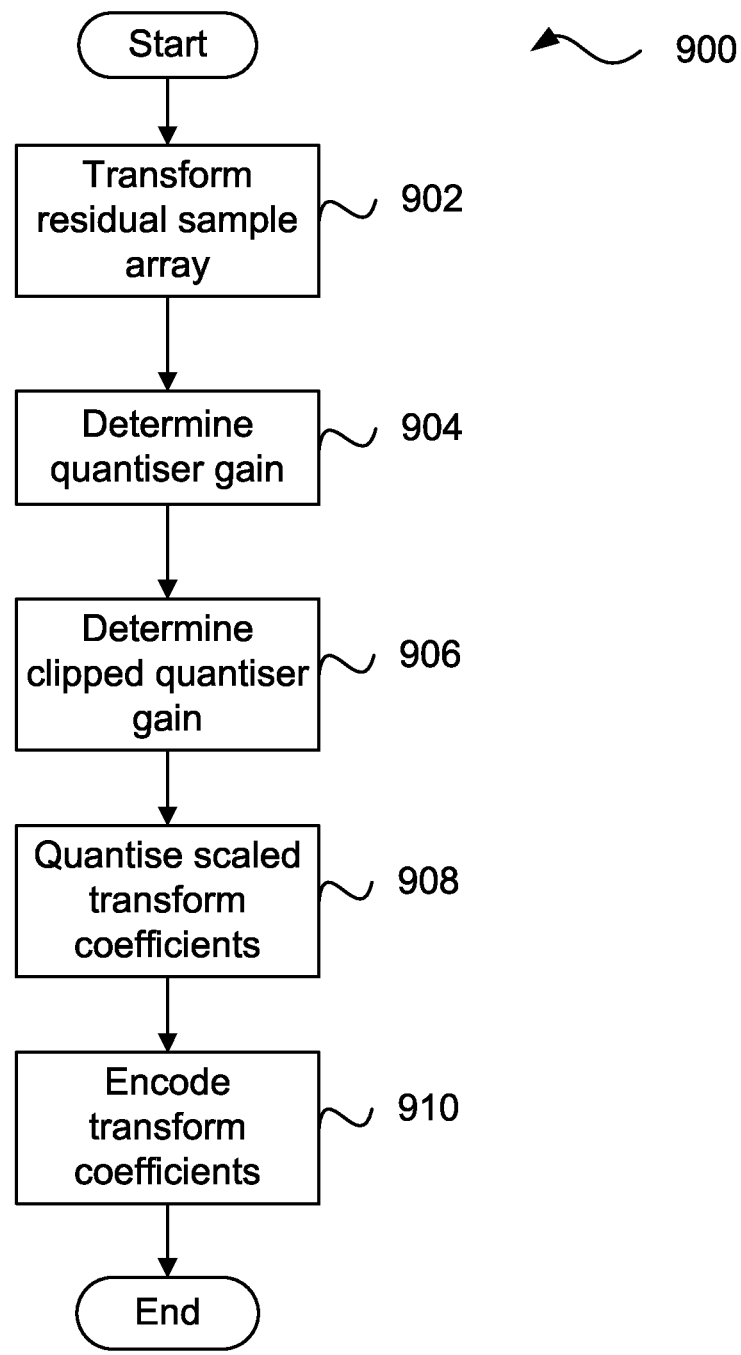
FIG. 9 is a schematic flow diagram showing a method of encoding transform coefficients in the video encoder of FIG. 3.

Each step or sub-process in the methods FIGS. 9 and 10 to be described is associated with one or more segments of the program 233 and is typically performed by the register section 244, 245, 247, the ALU 240, and the control unit 239 in the processor 205 working together to perform the fetch, decode, and execute cycles for every instruction in the instruction set for the noted segments of the program 233.

Figure 3:
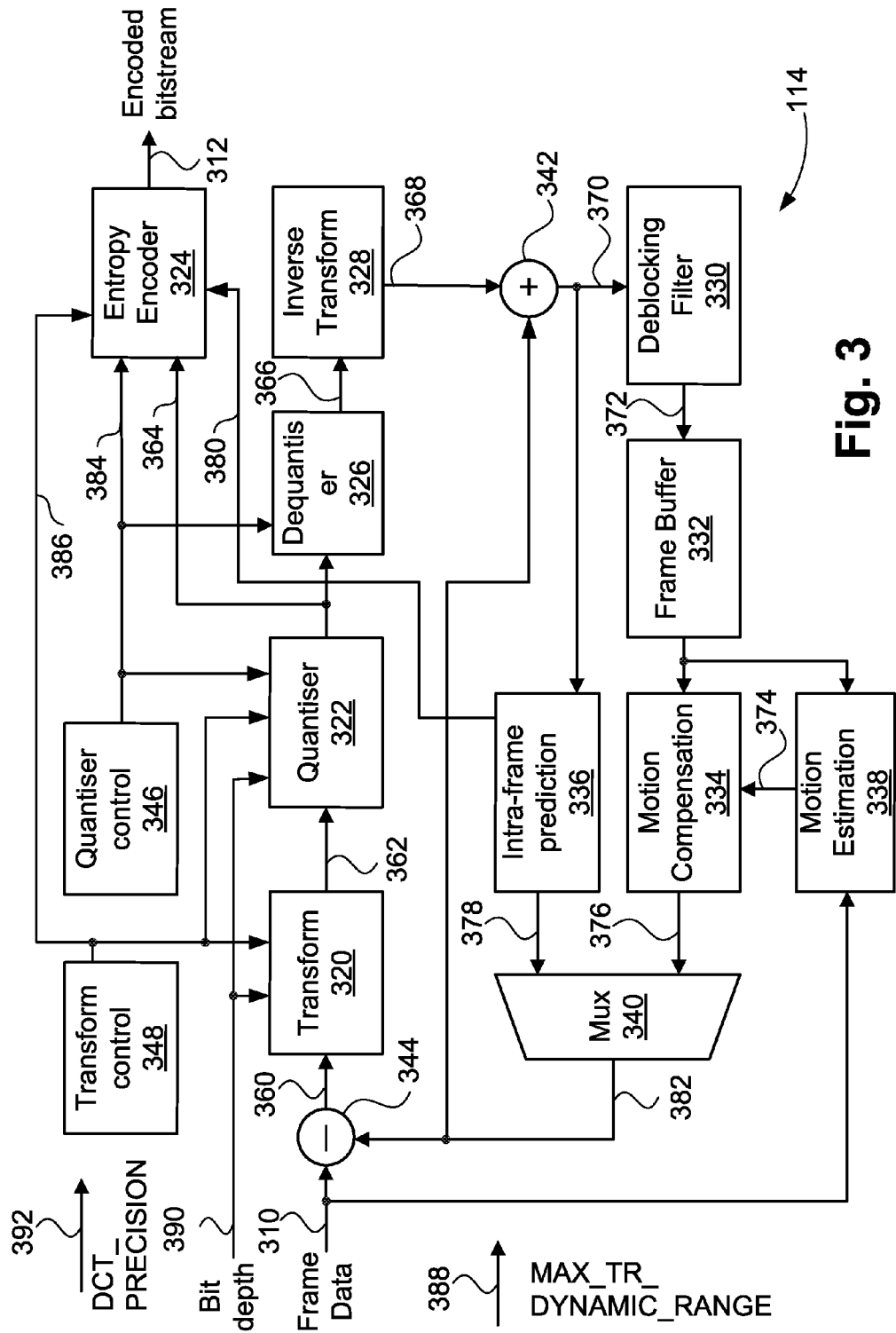
FIG. 3 is a schematic block diagram showing functional modules of a video encoder.
Figure 4:
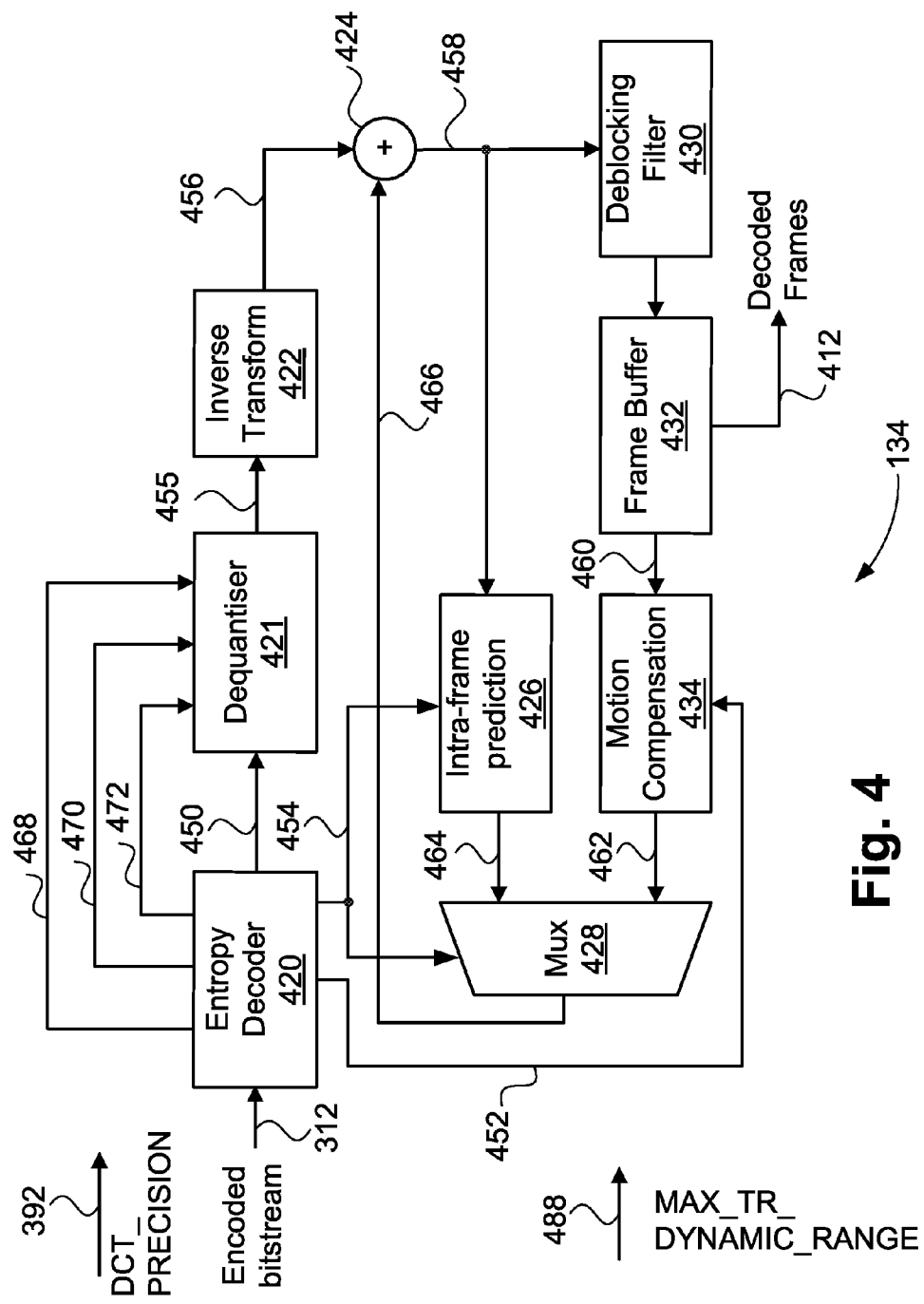
FIG. 4 is a schematic block diagram showing functional modules of a video decoder.

FIG. 3 is a schematic block diagram showing functional modules of the video encoder 114. FIG. 4 is a schematic block diagram showing functional modules of the video decoder 134. Generally, data is passed between functional modules within the video encoder 114 and the video decoder 134 in blocks or arrays (e.g., blocks of samples or blocks of transform coefficients). Where a functional module is described with reference to the behaviour of individual array elements (e.g., samples or a transform coefficient), the behaviour shall be understood to be applied to all array elements. The video encoder 114 and video decoder 134 may be implemented using a general-purpose computer system 200, as shown in FIGS. 2A and 2B, where the various functional modules may be implemented by dedicated hardware within the computer system 200, by software executable within the computer system 200 such as one or more software code modules of the software application program 233 resident on the hard disk drive 205 and being controlled in its execution by the processor 205, or alternatively by a combination of dedicated hardware and software executable within the computer system 200. The video encoder 114, the video decoder 134 and the described methods may alternatively be implemented in dedicated hardware, such as one or more integrated circuits performing the functions or sub functions of the described methods. Such dedicated hardware may include graphic processors, digital signal processors, application specific integrated circuits (ASICs), field programmable gate arrays (FPGAs) or one or more microprocessors and associated memories. In particular the video encoder 114 comprises modules 320-348 and the video decoder 134 comprises modules 420-434 which may each be implemented as one or more software code modules of the software application program 233.

Although the video encoder 114 of FIG. 3 is an example of a high efficiency video coding (HEVC) video encoding pipeline, other video codecs may also be used to perform the processing stages described herein. The video encoder 114 receives captured frame data, such as a series of frames, each frame including one or more colour channels.

The video encoder 114 divides each frame of the captured frame data, such as frame data 310, into regions generally referred to as 'coding tree blocks' (CTBs). Each coding tree block (CTB) includes a hierarchical quad-tree subdivision of a portion of the frame into a collection of 'coding units' (CUs). The coding tree block (CTB) generally occupies an area of 64×64 luma samples, although other sizes are possible, such as 16×16 or 32×32. In some cases even larger sizes for the coding tree block (CTB), such as 128×128 luma samples, may be used. The coding tree block (CTB) may be sub-divided via a split into four equal sized regions to create a new hierarchy level. Splitting may be applied recursively, resulting in a quad-tree hierarchy. As the coding tree block (CTB) side dimensions are powers of two and the quad-tree splitting results in a halving of the width and height, the region side dimensions are also powers of two. When no further split of a region is performed, a 'coding unit' (CU) is said to exist within the region. When no split is performed at the top level (or typically the "highest level") of the coding tree block, the region occupying the entire coding tree block contains one coding unit (CU). In such cases, the coding unit (CU) is generally referred to as a 'largest coding unit' (LCU). A minimum size also exists for each coding unit (CU), such as the area occupied by 8×8 luma samples, although other minimum sizes are also possible. Coding units of the minimum size are generally referred to as 'smallest coding units' (SCUs). As a result of the quad-tree hierarchy, the entirety of the coding tree block (CTB) is occupied by one or more coding units (CUs).

The video encoder 114 produces one or more arrays of data samples, generally referred to as 'prediction units' (PUs) for each coding unit (CU). Various arrangements of prediction units (PUs) in each coding unit (CU) are possible, with a requirement that the prediction units (PUs) do not overlap and that the entirety of the coding unit (CU) is occupied by the one or more prediction units (PUs). Such a requirement ensures that the prediction units (PUs) cover the entire frame area.

The video encoder 114 operates by outputting, from a multiplexer module 340, a prediction unit (PU) 382. A difference module 344 produces a 'residual sample array' 360. The residual sample array 360 is the difference between the prediction unit (PU) 382 and a corresponding 2D array of data samples from a coding unit (CU) of the coding tree block (CTB) of the frame data 310. The difference is calculated for corresponding samples at each location in the arrays. As differences may be positive or negative, the dynamic range of one difference sample is the bit-depth plus one bit.

The residual sample array 360 may be transformed into the frequency domain in a transform module 320. The residual sample array 360 from the difference module 344 is received by the transform module 320, which converts the residual sample array 360 from a spatial representation to a frequency domain representation by applying a 'forward transform'. The transform module 320 creates transform coefficients, according to a transform having a specific precision. The precision of the transform is specified via a DCT_PRECISION constant 392 constant. The dynamic range of the transform module 320 is specified by a MAX_TR_DYNAMIC_RANGE constant 388. The DCT_PRECISION constant 392 and the MAX_TR_DYNAMIC_RANGE constant 390 will be described further with reference to FIG. 5. The coding unit (CU) is sub-divided into one or more transform units (TUs). The sub-divided coding unit (CU) may be referred to as a 'residual quad-tree' or a 'residual quad-tree (RQT)'.

The quantiser control module 346 may test the bit-rate required in the encoded bitstream 312 for various possible quantisation parameter values according to a 'rate-distortion criterion'. The rate-distortion criterion is a measure of the acceptable trade-off between the bit-rate of the encoded bitstream 312, or a local region thereof, and distortion. Distortion is a measure of the difference between frames present in the frame buffer 332 and the captured frame data 310. Distortion may be determined using a peak signal to noise ratio (PSNR) or sum of absolute differences (SAD) metric. In some arrangements of the video encoder 114, the rate-distortion criterion considers only the rate and distortion for the luma colour channel and thus the encoding decision is made based on characteristics of the luma channel. Generally, the residual quad-tree (RQT) is shared between the luma and chroma colour channels, and the amount of chroma information is relatively small compared to luma, so considering luma only in the rate-distortion criterion may be appropriate.

A quantisation parameter 384 is output from the quantiser control module 346. The quantisation parameter may be fixed for a frame of video data, or may vary on a block by block basis as the frame is being encoded. Other methods for controlling the quantisation parameter 384 are also possible. The set of possible transform units (TUs) for a residual quad-tree is dependent on the available transform sizes and coding unit (CU) size. In one arrangement, the residual quad-tree results in a lower bit-rate in the encoded bitstream 312, thus achieving higher coding efficiency. A larger sized transform unit (TU) results in use of larger transforms for both the luma and chroma colour channels. Generally, larger transforms provide a more compact representation of a residual sample array with sample data (or 'residual energy') spread across the residual sample array. Smaller transform units (TUs) provide a more compact representation of a residual sample array with residual energy localised to specific regions of the residual sample array. Thus, the many possible configurations of a residual quad-tree (RQT) provide a useful means for achieving high coding efficiency of the residual sample array 360 in the high efficiency video coding (HEVC) standard.

A transform control module 348 selects a transform size for use in encoding each leaf node of the residual quad-tree (RQT). For example, a variety of transform sizes (and hence residual quad-tree configurations) may be tested and the transform size resulting in the best trade-off from a rate-distortion criteria may be selected. A transform size 386 represents the size of the selected transform. The transform size 386 is encoded in the encoded bitstream 312 and provided to the transform module 320, the quantiser module 322, the dequantiser module 326 and the inverse transform module 328. The transform size 386 may be represented by the transform dimensions (e.g. 4×4, 8×8, 16×16 or 32×32), the transform size (e.g. 4, 8, 16 or 32), or the log 2 of the transform size (e.g. 2, 3, 4 or 5) interchangeably. In circumstances where the numeric value of a particular representation of a transform size is used (e.g. in an equation) conversion from any other representation of the transform size deemed necessary, shall be considered to implicitly occur in the following description.

For the high efficiency video coding (HEVC) standard, conversion of the residual sample array 360 to the frequency domain representation is implemented using a transform such as a modified discrete cosine transform (DCT). In such transforms, the modification permits implementation using shifts and additions instead of multiplications. Such modifications enable reduced implementation complexity compared to a discrete cosine transform (DCT). In addition to the modified discrete cosine transform (DCT), a modified discrete sine transform (DST) may also be used in specific circumstances. Various sizes of the residual sample array 360 and the scaled transform coefficients 362 are possible, in accordance with supported transform sizes. In the high efficiency video coding (HEVC) standard, transforms are performed on 2D arrays of data samples having sizes, such as 32×32, 16×16, 8×8 and 4×4. Thus, a predetermined set of transform sizes are available to the video encoder 114. Moreover, the set of transform sizes may differ between the luma channel and the chroma channels.

Two-dimensional transforms are generally configured to be 'separable', enabling implementation as a first set of 1D transforms operating on the 2D array of data samples in one direction (e.g. on rows). The first set of 1D transforms is followed by a second set of 1D transform operating on the 2D array of data samples output from the first set of 1D transforms in the other direction (e.g. on columns) Transforms having the same width and height are generally referred to as 'square transforms'. Additional transforms, having differing widths and heights may also be used and are generally referred to as 'non-square transforms'. The row and column one-dimensional transforms may be combined into specific hardware or software modules, such as a 4×4 transform module or an 8×8 transform module.

Transforms having larger dimensions require larger amounts of circuitry to implement, even though such larger dimensioned transforms may be infrequently used. Accordingly, the high efficiency video coding (HEVC) standard defines a maximum transform size of 32×32 luma samples. Transforms may be applied to both the luma and chroma channels. Differences between the handling of luma and chroma channels with regard to transform units (TUs) exist. Each residual quad-tree occupies one coding unit (CU) and is defined as a quad-tree decomposition of the coding unit (CU) into a hierarchy including one transform unit (TU) at each leaf node of the residual quad-tree hierarchy. Each transform unit (TU) has dimensions corresponding to one of the supported transform sizes. Similarly to the coding tree block (CTB), it is necessary for the entirety of the coding unit (CU) to be occupied by one or more transform units (TUs). At each level of the residual quad-tree hierarchy a 'coded block flag value' signals possible presence of a transform in each colour channel. The signalling may indicate presence of a transform at the current hierarchy level (when no further splits are present), or that lower hierarchy levels may contain at least one transform among the resulting transform units (TUs). When the coded block flag value is zero, all residual coefficients at the present or lower hierarchy levels are known to be zero. In such a case, no transform is required to be performed for the corresponding colour channel of any transform units (TU) at the present hierarchical level or at lower hierarchical levels. When the coded block flag value is one, if the present region is not further sub-divided then the region contains a transform which requires at least one non-zero residual coefficient. If the present region is further sub-divided, a coded block flag value of one indicates that each resulting sub-divided region may include non-zero residual coefficients. In this manner, for each colour channel, zero or more transforms may cover a portion of the area of the coding unit (CU) varying from none up to the entirety of the coding unit (CU). Separate coded block flag values exist for each colour channel. Each coded block flag value is not required to be encoded, as cases exist where there is only one possible coded block flag value.

The scaled transform coefficients 362 are input to the quantiser module 322 where data sample values thereof are scaled and quantised, according to a determined quantisation parameter 384, to produce transform coefficients 364. The transform coefficients 364 are an array of values having the same dimensions as the residual sample array 360. The transform coefficients 364 provide a frequency domain representation of the residual sample array 360. For the discrete cosine transform (DCT), the upper-left value of the transform coefficients 364 specifies a 'DC' value for the residual sample array 360 and is known as a 'DC coefficient'. The DC coefficient is representative of the 'average' of the values of the residual sample array 360. Other values in the transform coefficients 364 specify 'AC coefficients' for the residual sample array 360. The scale and quantisation results in a loss of precision, dependent on the value of the determined quantisation parameter 384. A higher value of the determined quantisation parameter 384 results in greater information being lost from the residual data. The loss of information increases the compression achieved by the video encoder 114, as there is less information to encode. This increase in compression efficiency occurs at the expense of reducing the visual quality of output from the video decoder 134. The determined quantisation parameter 384 may be adapted during encoding of each frame of the frame data 310. Alternatively, the determined quantisation parameter 384 may be fixed for a portion of the frame data 310. In one arrangement, the determined quantisation parameter 384 may be fixed for an entire frame of frame data 310. Other adaptations of the determined quantisation parameter 384 are also possible, such as quantising different residual coefficients with separate values.

The transform coefficients 364 and determined quantisation parameter 384 are taken as input to the dequantiser module 326. The dequantiser module 326 reverses the scaling performed by the quantiser module 322 to produce rescaled transform coefficients 366. The rescaled transform coefficients are rescaled versions of the transform coefficients 364. The transform coefficients 364, the determined quantisation parameter 384, the transform size 386 and the bit-depth 390 are also taken as input to an entropy encoder module 324. The entropy encoder module 324 encodes the values of the transform coefficients 364 in an encoded bitstream 312 (or 'video bitstream'). Due to the loss of precision resulting from the operation of the quantiser module 322, the rescaled transform coefficients 366 are not identical to the original values in the scaled transform coefficients 362. The rescaled transform coefficients 366 from the dequantiser module 326 are then output to an inverse transform module 328. The inverse transform module 328 performs an inverse transform from the frequency domain to the spatial domain to produce a spatial-domain representation 368 of the rescaled transform coefficients 366. The inverse transform module 328 has a precision according to the DCT_PRECISION constant 392 and a dynamic range according to the MAX_TR_DYNAMIC_RANGE constant 388. The spatial-domain representation 368 is substantially identical to a spatial domain representation that is produced at the video decoder 134. The spatial-domain representation 368 is then input to a summation module 342.

A motion estimation module 338 produces motion vectors 374 by comparing the frame data 310 with previous frame data from one or more sets of frames stored in a frame buffer module 332, generally configured within the memory 206. The sets of frames are known as 'reference picture lists'. The motion vectors 374 are then input to a motion compensation module 334 which produces an inter-predicted prediction unit (PU) 376 by filtering data samples stored in the frame buffer module 332, taking into account a spatial offset derived from the motion vectors 374. Not illustrated in FIG. 3, the motion vectors 374 are also passed as syntax elements to the entropy encoder module 324 for encoding in the encoded bitstream 312. The intra-frame prediction module 336 produces an intra-predicted prediction unit (PU) 378 using samples 370 obtained from the summation module 342. The summation module 344 sums the prediction unit (PU) 382 from the multiplexer module 340 and the spatial domain output of the multiplexer 382. The intra-frame prediction module 336 also produces an intra-prediction mode 380 which is sent to the entropy encoder 324 for encoding into the encoded bitstream 312.

Prediction units (PUs) may be generated using either an intra-prediction or an inter-prediction method. Intra-prediction methods make use of data samples adjacent to the prediction unit (PU) that have previously been decoded (typically above and to the left of the prediction unit) in order to generate reference data samples within the prediction unit (PU). Various directions of intra-prediction are possible, referred to as the 'intra-prediction mode'. Inter-prediction methods make use of a motion vector to refer to a block from a selected reference frame. The motion estimation module 338 and motion compensation module 334 operate on motion vectors 374, having a precision of one eighth (⅛) of a luma sample, enabling precise modelling of motion between frames in the frame data 310. The decision on which of the intra-prediction or the inter-prediction method to use is made according to a rate-distortion trade-off. The trade-off is made between the desired bit-rate of the resulting encoded bitstream 312 and the amount of image quality distortion introduced by either the intra-prediction or inter-prediction method. If intra-prediction is used, one intra-prediction mode is selected from the set of possible intra-prediction modes, also according to a rate-distortion trade-off. The multiplexer module 340 may select either the intra-predicted reference samples 378 from the intra-frame prediction module 336, or the inter-predicted prediction unit (PU) 376 from the motion compensation block 334.

The summation module 342 produces a sum 370 that is input to a de-blocking filter module 330. The de-blocking filter module 330 performs filtering along block boundaries, producing de-blocked samples 372 that are written to the frame buffer module 332 configured within the memory 206. The frame buffer module 332 is a buffer with sufficient capacity to hold data from one or more past frames for future reference as part of a reference picture list.

For the high efficiency video coding (HEVC) standard, the encoded bitstream 312 produced by the entropy encoder 324 is delineated into network abstraction layer (NAL) units. Generally, each slice of a frame is contained in one NAL unit. The entropy encoder 324 encodes the transform coefficients 364, the intra-prediction mode 380, the motion vectors and other parameters, collectively referred to as 'syntax elements', into the encoded bitstream 312 by performing a context adaptive binary arithmetic coding (CABAC) algorithm. Syntax elements are grouped together into 'syntax structures'. The groupings may contain recursion to describe hierarchical structures. In addition to ordinal values, such as an intra-prediction mode or integer values, such as a motion vector, syntax elements also include flags, such as to indicate a quad-tree split.

Although the video decoder 134 of FIG. 4 is described with reference to a high efficiency video coding (HEVC) video decoding pipeline, other video codecs may also employ the processing stages of modules 420-434. The encoded video information may also be read from memory 206, the hard disk drive 210, a CD-ROM, a Blu-ray™ disk or other computer readable storage medium. Alternatively the encoded video information may be received from an external source, such as a server connected to the communications network 220 or a radio-frequency receiver.

As seen in FIG. 4, received video data, such as the encoded bitstream 312, is input to the video decoder 134. The encoded bitstream 312 may be read from memory 206, the hard disk drive 210, a CD-ROM, a Blu-ray™ disk or other computer readable storage medium. Alternatively the encoded bitstream 312 may be received from an external source such as a server connected to the communications network 220 or a radio-frequency receiver. The encoded bitstream 312 contains encoded syntax elements representing the captured frame data to be decoded.

The encoded bitstream 312 is input to an entropy decoder module 420 which extracts the syntax elements from the encoded bitstream 312 and passes the values of the syntax elements to other blocks in the video decoder 134. The entropy decoder module 420 applies the context adaptive binary arithmetic coding (CABAC) algorithm to decode syntax elements from the encoded bitstream 312. The decoded syntax elements are used to reconstruct parameters within the video decoder 134. Parameters include zero or more residual data array 450, motion vectors 452, a prediction mode 454, a quantisation parameter 468, a transform size 470 and a bit-depth 472. The transform size 470 was encoded in the encoded bitstream 312 by the video encoder 114 according to the transform size 386. The bit-depth 472 was encoded in the encoded bitstream 312 by the video encoder 114 according to the bit-depth 390. The quantisation parameter 468 was encoded in the encoded bitstream 312 by the video encoder 114 according to the quantisation parameter 384. Thus the transform size 470 is equal to the transform size 386, the bit-depth 472 is equal to the bit-depth 390 and the quantisation parameter 468 is equal to the quantisation parameter 384. The residual data array 450 is passed to a dequantiser module 421, the motion vectors 452 are passed to a motion compensation module 434, and the prediction mode 454 is passed to an intra-frame prediction module 426 and to a multiplexer 428.

The dequantiser module 421 performs inverse scaling on the residual data of the residual data array 450 to create reconstructed data 455 in the form of transform coefficients. The dequantiser module 421 outputs the reconstructed data 455 to an inverse transform module 422. The inverse transform module 422 applies an 'inverse transform' to convert the reconstructed data 455 (i.e., the transform coefficients) from a frequency domain representation to a spatial domain representation, outputting a residual sample array 456 via a multiplexer module 423. The inverse transform module 422 performs the same operation as the inverse transform module 328. The inverse transform module 422 is configured to perform inverse transforms sized in accordance with the transform size 470 having a bit-depth according to the bit-depth 472. The transforms performed by the inverse transform module 422 are selected from a predetermined set of transform sizes required to decode an encoded bitstream 312 that is compliant with the high efficiency video coding (HEVC) standard. The dynamic range of the inverse transform module 422 is specified by a MAX_TR_DYNAMIC_RANGE constant 488. The MAX_TR_DYNAMIC_RANGE constant 488 defines the dynamic range and data bus width requirements of the inverse transform module 422 in the same way that the MAX_TR_DYNAMIC_RANGE constant 388 defines the dynamic range and data bit width requirements of the transform module 320.

The motion compensation module 434 uses the motion vectors 452 from the entropy decoder module 420, combined with reference frame data 460 from a frame buffer block 432, configured within the memory 206, to produce an inter-predicted prediction unit (PU) 462 for a prediction unit (PU). The inter-prediction prediction unit (PU) 462 is a prediction of output decoded frame data based upon previously decoded frame data. When the prediction mode 454 indicates that the current prediction unit (PU) was coded using intra-prediction, the intra-frame prediction module 426 produces an intra-predicted prediction unit (PU) 464 for the prediction unit (PU). The intra-prediction prediction unit (PU) 464 is produced using data samples spatially neighbouring the prediction unit (PU) and a prediction direction also supplied by the prediction mode 454. The spatially neighbouring data samples are obtained from a sum 458, output from a summation module 424. The multiplexer module 428 selects the intra-predicted prediction unit (PU) 464 or the inter-predicted prediction unit (PU) 462 for a prediction unit (PU) 466, depending on the current prediction mode 454. The prediction unit (PU) 466, which is output from the multiplexer module 428, is added to the residual sample array 456 from the inverse scale and transform module 422 by the summation module 424 to produce sum 458. The sum 458 is then input to each of a de-blocking filter module 430 and the intra-frame prediction module 426. The de-blocking filter module 430 performs filtering along data block boundaries, such as transform unit (TU) boundaries, to smooth visible artefacts. The output of the de-blocking filter module 430 is written to the frame buffer module 432 configured within the memory 206. The frame buffer module 432 provides sufficient storage to hold one or more decoded frames for future reference. Decoded frames 412 are also output from the frame buffer module 432 to a display device, such as the display device 136 (e.g., in the form of the display device 214).

Figure 5:
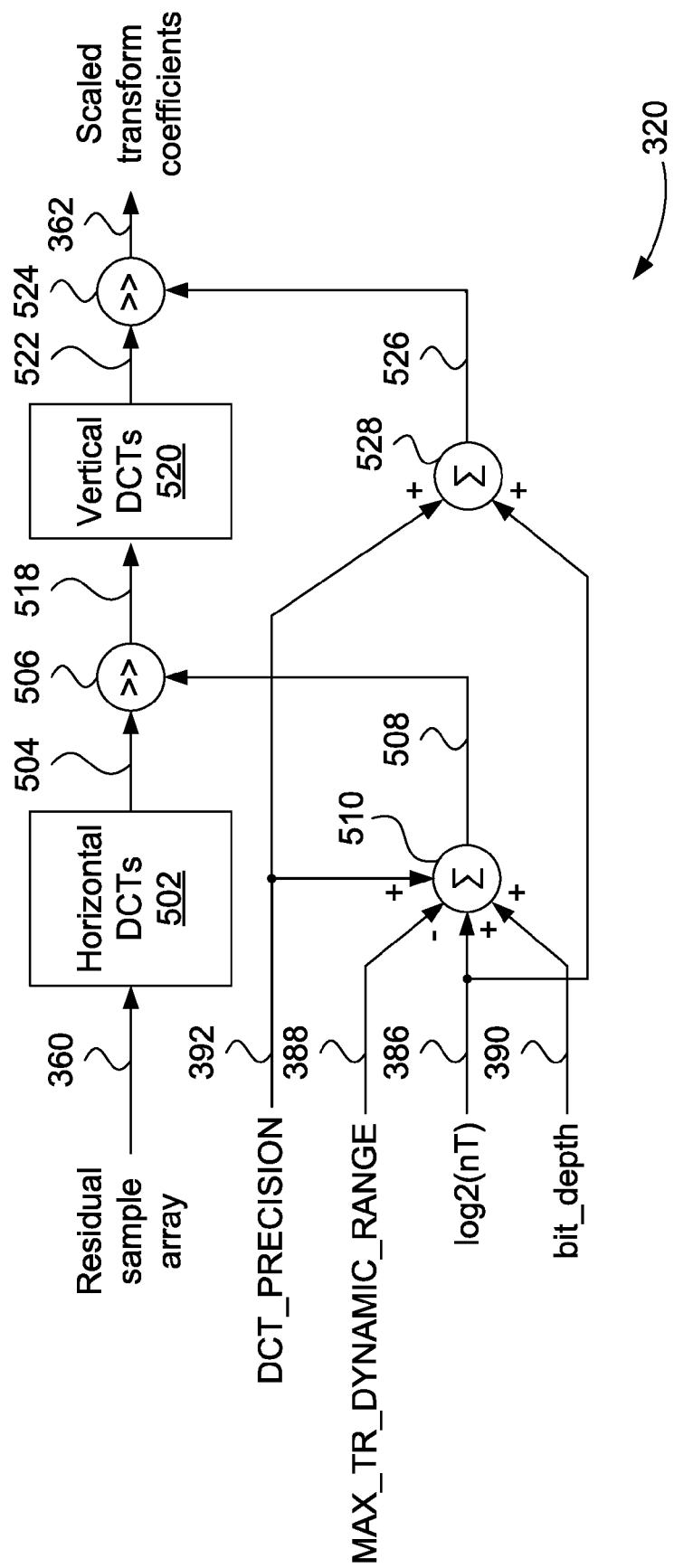
FIG. 5 is a schematic block diagram showing functional modules of a forward transform module in the video encoder of FIG. 3.

FIG. 5 is a schematic block diagram showing functional modules of the transform module 320 of the video encoder 114. The transform module 320 performs a two-dimensional transform on the residual sample array 360. A set of modified one-dimensional discrete cosine transforms (DCT) is applied firstly horizontally and then vertically to transform the two-dimensional block of residual samples of the array 360 into a frequency domain representation. When the frame data input to the video encoder 114 is continuous, such as is typical from an imaging sensor, the frequency domain representation of the block of residual samples has relatively few residual coefficients with large magnitudes. Although the spatial domain representation and the frequency domain representation are both arrays having the same dimensions, in the frequency domain representation, most of the array values are zero (or close to zero). In this sense the frequency domain representation is more compact than the spatial domain representation.

When captured frame data 310 is obtained from a source such as an imaging sensor, the captured frame data 310 generally has continuous changes in magnitude over a given spatial area. Consequently, the frequency domain representation tends to comprise mostly low frequency coefficients.

The residual sample array 360 is a block of residual samples, obtained from the difference module 344, generally having a square shape and dimensions corresponding to one of the supported transform sizes. Each sample from the difference module 344 has a range defined by the extreme differences between the two inputs 310 and 382. To accommodate extremes of input data, each sample output from the difference module 344 has a width equal to the bit-depth plus one bit. For example, when bit-depth is equal to eight (8), sample values range from [0, 255] and each sample output from the difference module 344 ranges from [−255, 255], resulting in the difference module 344 output being nine (9) bits wide. For higher bit-depths a correspondingly wider range of output samples is produced by the difference module 344.

The residual sample array 360 is input to a horizontal DCTs module 502. The horizontal DCTs module 502 comprises an array of one-dimensional discrete cosine transforms (DCTs) arranged such that each row of samples in the residual sample array 360 is input to one discrete cosine transform (DCT). The number of discrete cosine transforms (DCTs) of the horizontal DCTs module 502 is equal to the height of the residual sample array 360. The length of each discrete cosine transform (DCT) of the horizontal DCTs module 502 is equal to the width of the residual sample array 360. The set of supported transform sizes means that a 4-point, an 8-point, a 16-point and a 32-point one-dimensional discrete cosine transform (DCT) is required. Although the horizontal DCTs module 502 is described as performing a modified integer discrete cosine transform (DCT), other transforms may be performed. For example, when a 4-point one-dimensional length is selected, an integer modified discrete sine transform (DST) may be used.

The one-dimensional transforms in the horizontal DCT module 502 may be implemented in several ways. In one arrangement, a matrix multiplication may be used to implement the module 502. However, using the matrix multiplication to implement the module 502 generally has higher hardware cost. As for software implementations, matrix multiplications may be used in some architectures, such as processors 205 supporting single instruction multiple data (SIMD). A partial butterfly implementation affords reduced complexity. Through careful specification of the matrix used to define the transform, it is possible for further complexity reductions to be performed. For example, particular matrix values may allow 'factorisation', which further reduces complexity.

The term 'nT' is used synonymously below with the term 'transform size' which refers to the side dimension of the transform (e.g., an nT=4 for a 4×4 transform). A parameter 'M' is defined as the Log 2 of the largest transform size. Generally, 'M' has a value of 5, as 32×32 is the largest supported transform size. A 'MAX_TR_DYNAMIC_RANGE' constant 388 is defined to represent a dynamic range restriction at particular points in the transform module 320 and the inverse transform module 422.

The MAX_TR_DYNAMIC_RANGE constant 388 defines the log 2 of the magnitude of permitted values, noting that both positive and negative sign are generally supported throughput the transform module 320 and the inverse transform module 422. Thus, for a MAX_TR_DYNAMIC_RANGE constant 388 of fifteen (15), magnitudes are restricted to [−32768, 32767]. The MAX_TR_DYNAMIC_RANGE constant 388 thus defines a bus width of particular stages within the transform module 320 and the inverse transform module 422. Accordingly, a higher value of the MAX_TR_DYNAMIC_RANGE constant 388 results in increased circuit size, or complexity. Additionally, intermediate values computed within the transform module 320 and the inverse transform module 422 may have increased bus width, due to the 'gain' of intermediate processing stages. In these cases, the increase in the bus width is generally relative to the MAX_TR_DYNAMIC_RANGE constant 388.

The input to the horizontal DCTs module 502 is known to be bit-depth plus one bit in width, due to the width of the residual samples array 360. A one-dimensional integer modified discrete cosine transform (DCT) has gain in terms of the integer magnitude due to transform size and due to the matrix coefficients. In the high efficiency video coding (HEVC) standard, the particular matrices defined for the inverse transform have coefficient magnitudes that result in a dynamic range increase ('L1Norm') according to the following table:

DST: 4-pt: L1Norm = 242 (8-bits). Log2(nT) = 2
DCT: 4-pt: L1Norm = 247 (8-bits). Log2(nT) = 2
DCT: 8-pt: L1Norm = 479 (9-bits). Log2(nT) = 3
DCT: 16-pt: L1Norm = 940 (10-bits). Log2(nT) = 4
DCT: 32-pt: L1Norm = 1862 (11-bits). Log2(nT) = 5

The dynamic range increase for a particular transform size (nT) is expressed as the number of bits required for the L1Norm of the matrix. Part of the dynamic range increase may be considered to be due to the transform size, nT. Adjusting for the part of dynamic range increase due to the transform size, the dynamic range increase for the matrix coefficients of the inverse transform (i.e. independent of the transform size) is six (6) bits. A parameter 'DCT_PRECISION' is defined to represent the dynamic range increase for the matrix coefficients of the inverse transform. For the high efficiency video coding (HEVC) standard, the DCT_PRECISION constant 392 has a value of six (6). A constant M is defined as the log 2 of the largest transform size (i.e. 5, due to the largest transform size of 32×32). The corresponding transform matrix is defined in Appendix A.

The transform matrix of Appendix A is a 32×32 array of integer matrix coefficients, suitable for implementing a one-dimensional 32-point transform. To implement the 16-point transform, a 16×16 array of matrix coefficients is required. This is obtained from the first sixteen (16) coefficients of every second row of the matrix of Appendix A. Likewise, an 8×8 array is obtained from the first 8 coefficients of every fourth row of the matrix of Appendix A. Also, a 4×4 array is obtained from the first 4 coefficients of every eighth row of the matrix of Appendix A. An integer discrete cosine transform (DCT) is an approximation of a 'true' cosine transform. It is possible to construct matrices with higher magnitude integer coefficients that more closely approximate a cosine transform, thus increasing precision. Such matrices have a correspondingly increase DCT_PRECISION value. An example of such a high-precision transform matrix is provided in Appendix B. The transform matrix of Appendix B has a DCT_PRECISION value of eight (8). The forward transform corresponding to the inverse transform specified in the high efficiency video coding (HEVC) standard generally has the same DCT_PRECISION. As seen in FIG. 5, a horizontal DCT intermediate output 504 holds the result of the horizontal DCTs module 502. The horizontal DCT intermediate output 504 may be a held in a register under execution of the processor 205. Alternatively, horizontal DCT intermediate output 504 may be configured as signals in a bus within an ASIC. In either case, a limitation exists on the range of possible values the horizontal DCT intermediate output 504. For software implementations of the module 320, generally a word (or register width) limit exists that should not be exceeded, (e.g., 32 bits due to register width). Although it is possible for software to process words having greater width than the available register width, this requires splitting the word across multiple registers, resulting in increased complexity and/or run-time.

For hardware implementations of the module 320, minimising the word limit (or 'bus width') is desirable to reduce circuit area. The required width of the horizontal DCT intermediate output 504 is the "input width+DCT_PRECISION+M, or bit-depth+1+DCT_PRECISION+M". The horizontal DCT intermediate output 504 is passed to a right shift module 506. The right shift module 506 shifts the input to the right according to a right shift amount (i.e. towards the least significant bit). Bits that would be shifted below the least significant bit are discarded. When a negative right shift amount is specified, the right shift module performs a left shift (i.e. bits are shifted towards the most significant bit of the word). The right shift module 506 produces a horizontal DCT output 518 by shifting the horizontal DCT intermediate output 504 by a number of bits, specified by a right shift amount 508. As the horizontal DCTs module 502 operates on each row of the residual sample array 360, the horizontal DCT output 518 is an array of values, having the same dimensions as the residual sample array 360, although the bit-width of each value differs. The right shift operation of the right shift module 506 results in a loss of data, as bits shifted below the lowest significant bit (LSB) of each output value are lost. A rounding operation is applied in the right shift module 506 whereby a constant is added to the input prior to the shifting. The constant value is equal two (2) raised to the power of the result of one subtracted from the shift amount 508. For example, with a shift amount 508 of seven (7), the constant value is sixty-four (64). The horizontal DCT output 518 has a width according to MAX_TR_DYNAMIC_RANGE+1 (with one additional bit for the sign). One method of compensating for the loss of right shift operations, such as due to the right shift module 506 is to increase the MAX_TR_DYNAMIC_RANGE constant 388. Such an increase incurs a substantial increase in implementation complexity, as many busses and registers are increased in width and many modules must support data input having a wider range. Although the horizontal DCT output 518 is an integer value, the horizontal DCT output 518 may be interpreted as fractional values from [−1, 1]. In such interpretations, a 'decimal point' exists at the MAX_TR_DYNAMIC_RANGE bit of the horizontal DCT output 518. Moreover, in such interpretations, to fully exploit the available precision for a given value of the MAX_TR_DYNAMIC_RANGE constant 388, the integer values at the horizontal DCT output 518 should be left-aligned (i.e. the magnitude should be aligned to the most significant bit (MSB) of the horizontal DCT output 518). The alignment of the horizontal DCT output 518 is controlled by the right shift amount 508. For given values of MAX_TR_DYNAMIC_RANGE and DCT_PRECISION, the right shift amount 508 is then determined by the bit-depth and the transform size. For example, when MAX_TR_DYNAMIC_RANGE is equal to fifteen (15) and DCT_PRECISION is equal to six (6), the right shift amount 508 may be set to "bit depth+log 2(nT)−9".

In order to compensate for the gain of the horizontal DCTs 502 for different matrix coefficients, each increment of DCT_PRECISION requires a corresponding increment of the right shift amount 508. In order to maintain left-alignment of data at the horizontal DCT output 518, each increment of MAX_TR_DYNAMIC_RANGE requires a corresponding decrement of the right shift amount 508. Thus, a general rule for the right shift amount 508 may be stated as "log 2(nT)+bit depth+DCT_PRECISION−MAX_TR_DYNAMIC_RANGE".

In the transform module 320 of FIG. 5, a sum module 510 computes the right shift amount 508 using the DCT_PRECISION constant 392, the MAX_TR_DYNAMIC_RANGE constant 388, a bit-depth 390 of the video data and a log 2(nT) 386 as inputs. As the DCT_PRECISION constant 392 and the MAX_TR_DYNAMIC_RANGE constant 388 are both fixed, in one arrangement the DCT_PRECISION constant 392 and the MAX_TR_DYNAMIC_RANGE constant 388 may be combined into a single term for the sum module 510. A vertical DCTs module 520 then performs a one-dimensional DCT on each column of the horizontal DCT output 518. The vertical DCTs module 520 generally performs the same matrix multiplication as the horizontal DCTs module 502. As with the horizontal DCTs module 502, some arrangements of the encoder 114 may use approaches that reduce complexity, such as partial butterfly implementations, while retaining the same function as a full matrix multiplication.

As with the horizontal DCTs module 502, the vertical DCTs module 520 have a gain due to both the DCT_PRECISION constant 392 and the transform size 386. In contrast to the horizontal DCTs 502, input to the vertical DCTs 520 are values left-aligned and thus using the full width (i.e., MAX_TR_DYNAMIC_RANGE+one bit representative of the sign (the 'sign bit')). The width of vertical DCT intermediate output 522 is MAX_TR_DYNAMIC_RANGE+DCT_PRECISION+M+1.

As with the horizontal DCTs module 502, it is necessary to compensate for the DCT_PRECISION constant 392 and the transform size 386. A right shift module 524 performs this compensation by applying a right-shift, with rounding in accordance with the right shift module 510, to the vertical DCT intermediate output 522 to produce the scaled transform coefficients 362. A right shift amount 526 specifies how many bits the right shift module 524 shifts by. The right shift amount 526 is determined by a sum module 528 to be the sum of the DCT_PRECISION constant 392 and the log 2(nT) 386. The scaled transform coefficients 362 are an array equal in size to the residual sample array 360. As described below, the scaled transform coefficients 362 have a dynamic range with each value of the array 360 having a binary width of MAX_TR_DYNAMIC_RANGE (+sign bit) bits. The architecture of the transform module 320 thus exploits the full dynamic range of the available circuitry, regardless of the transform size and the input bit-depth, thus achieving the best possible performance from the available circuitry. Moreover, the scaled transform coefficients 362 are always left-aligned to use the full available word width. When high bit-depths, such as sixteen (16), are used, the dynamic range afforded by the MAX_TR_DYNAMIC_RANGE constant 388 value of fifteen (15) may be exceeded. In such cases, implementations using an increased MAX_TR_DYNAMIC_RANGE constant 388 may be realised. While such an increase may be costly in terms of complexity (e.g. due to increased bus width and/or circuit size), such an increase may be justified in order to achieve high PSNRs. In one arrangement of the video encoder 114, the MAX_TR_DYNAMIC_RANGE constant 388 may be set to the bit-depth plus five (5). Thus, to support a bit-depth of sixteen (16) bits, the value for the MAX_TR_DYNAMIC_RANGE constant 388 may be twenty-one (21).

Figure 6:
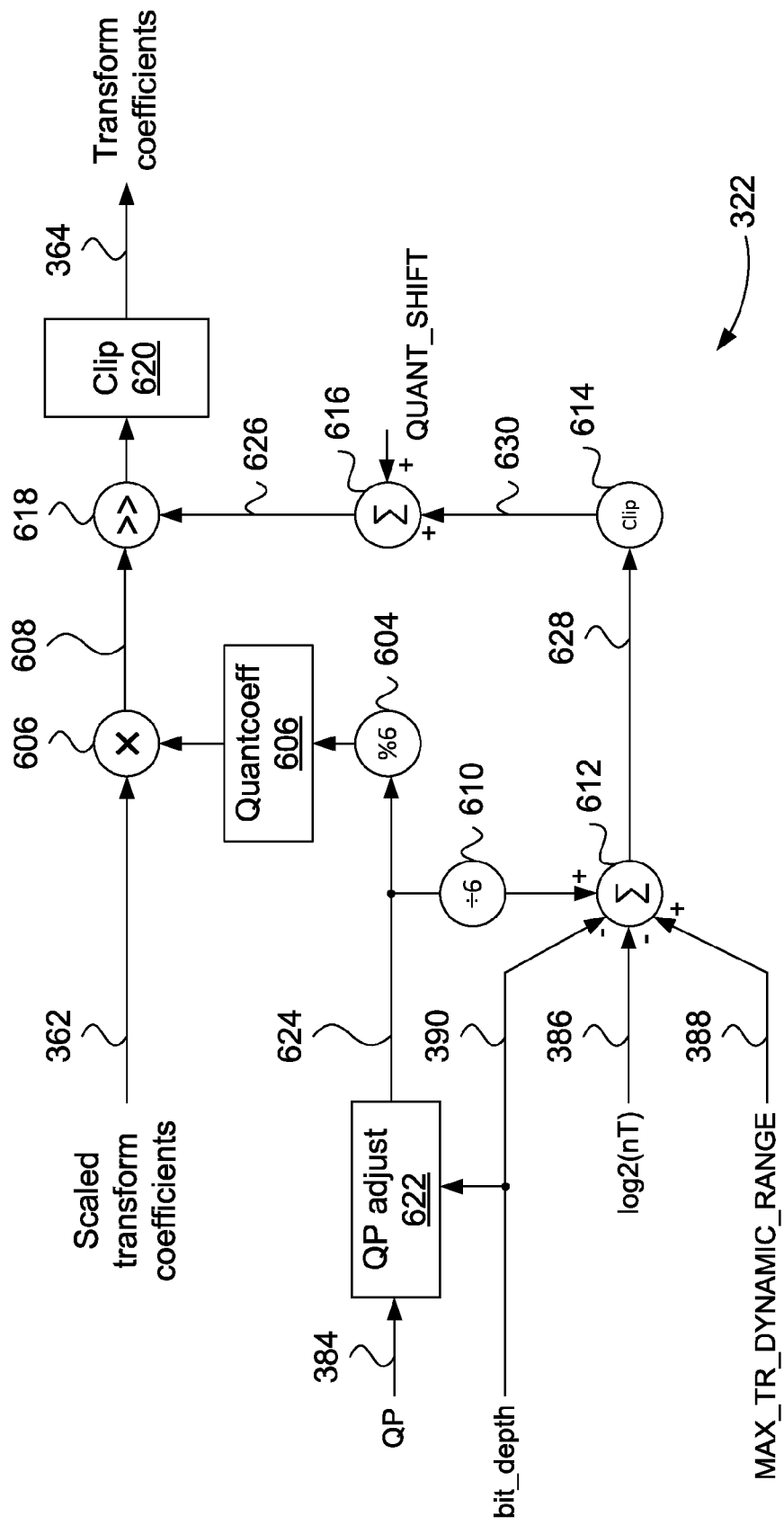
FIG. 6 is a schematic block diagram showing functional modules of a quantiser module in the video encoder of FIG. 3.

FIG. 6 is a schematic block diagram showing functional modules of the quantiser module 322. The quantiser module 322 is configured to reduce the magnitude (or 'quantise') the scaled transform coefficients 362 to produce the transform coefficients 364 according to a 'quantisation parameter'. Larger quantisation parameter values result in smaller magnitudes for the transform coefficients 364. Quantisation is a lossy process, consequently at higher quantisation parameter values, the PSNR of the output from the video decoder 134 will be lower. The quantisation parameter may be fixed for one or more frames, or may be varied down on a block by block basis. Varying the quantisation parameter is useful for applications where the communication channel 120 has limited bandwidth and low overall latency is required. In such applications, the quality may be reduced if the channel bandwidth would otherwise be exceeded in order to prevent frame loss due to buffering of the encoded bitstream 312.

The quantiser module 322 behaves such that each incrementing of the quantisation parameter 384 by six results in a halving of the magnitude of the transform coefficients 364. The quantisation parameter 384 is input to a QP adjust module 622 which adjusts the quantisation parameter 384 according to the bit depth 390 to produce a QP-prime 624. A QP-prime 624 is equal to the quantisation parameter 384 plus six times the result of bit-depth minus 8 (i.e. QP-prime=QP+6*(bit depth−8)). The quantiser module 322 may be considered to apply a (QP-dependent) gain to the scaled transform coefficients 362.

The transform module 320 and the quantiser module 322 have the following behaviour at QP-prime of four: If the nT×nT sized residual sample array 360 consists of a DC value having value 'x', the DC coefficient of the transform coefficients 364 will be equal to nT*x. Quantisation accords with a geometric progression such that every six QP-prime increments results in a halving of the magnitude of the transform coefficients 364, with intermediate QP-prime values scaled accordingly. A modulo 6 module 604 determines the modulo 6 of the QP-prime 624, producing a QP-prime remainder. The QP-prime remainder value, from zero (0) to five (5), is passed to a Quantcoeff module 606. The Quantcoeff module 606 provides an array of values that approximates the geometric progression. The array of values is generally equal to [26214, 23302, 20560, 18396, 16384, 14564], although other arrays of values are also possible. To achieve high accuracy and due to the integer implementation of the quantiser module 322, a large positive gain exists in the array of values provided by the Quantcoeff module 606. By normalising the array of values provided by the Quantcoeff module 606 to the QP-prime remainder value of four, the gain of the array of values is 16384, or two to the power of fourteen (14).

The gain due to multiplication by a value from the Quantcoeff module 606 represents effectively a left shift of fourteen bits. For QP-prime remainder values from zero to three, the gain of the array of values provided by the Quantcoeff module 606 is larger than 16384 (but less than 32768) so effectively, an additional one bit of gain exists when the QP-prime remainder values are used.

The output of the Quantcoeff module 606 is passed to a multiplier module 606 to produce a product 608. The multiplier module 606 applies the selected value from the array of values to each coefficient of the scaled transform coefficients 362. As the scaled transform coefficients 362 have MAX_TR_DYNAMIC_RANGE bits width (plus one sign bit) and the Quantcoeff module 606 output has fifteen (15) bits output width, the product 608 has a width of MAX_TR_DYNAMIC_RANGE plus sixteen (16) bits.

The product 608 is passed to a right shift module 618. The right shift module operates as described with reference to the right shift module 506 of FIG. 5. The right shift module 506 performs a right shift according to a right shift amount 626. The right shift amount 626 is produced from a sum module 616. The sum module 616 adds a constant QUANT_SHIFT to a clipped shift amount 630. The constant QUANT_SHIFT amount has a value intended to compensate for the gain introduced by the output of the Quantcoeff module 606. Generally, the QUANT_SHIFT constant has a value of fourteen (14). Thus, for values of the quantisation parameter 384 such that the QP-prime remainder is equal to four, the gain from the multiplier module 606 and the contribution of QUANT_SHIFT to the right shift amount 626 cancel out. The gain of the quantiser 322 is also dependent on the quantisation parameter 384, the bit-depth 390, log 2(nT) 386 and the MAX_TR_DYNAMIC_RANGE constant 388.

A divider module 610 produces a quotient (or 'QP period') by performing an integer division of QP-prime 624 by six. A sum module 612 produces a sum 628 by adding the quotient to the MAX_TR_DYNAMIC_RANGE constant 388 and subtracting from this the bit-depth 390 and log 2(nT) 386. The sum 628, when passed to the sum module 616 (i.e. having QUANT_SHIFT added) may be applied as the right shift amount 626. In this situation, the quantiser module 322 behaves such that the DC coefficient of the transform coefficients 362 is equal to the DC value 'x' of the residual sample array 360 multiplied by the size of the transform nT when QP-prime 624 is equal to four. For a given bit-depth 390, the bit-width of the transform coefficients 364 is thus equal to "bit depth+M+2", where the plus two, "+2", is due to one bit for the sign bit and another bit for QP-prime remainder values from zero to three. If the video encoder 114 is configured to use a high bit-depth (e.g. 16), then the bit width of the output of the sum module 618 would be "16+5+2=23 bits", where M=5 and the largest transform size is 32×32.

The output of the right shift module 618 is generally passed through a clip module 620. The clip module 620 may apply a clip according to plus/minus two to the power of an ENTROPY_CODING_DYNAMIC_RANGE constant.

The ENTROPY_CODING_DYNAMIC_RANGE constant defines the range of the transform coefficients 364 and thus the range of values to be encoded in the encoded bitstream 312.

The ENTROPY_CODING_DYNAMIC_RANGE constant may be assigned the same value as the MAX_TR_DYNAMIC_RANGE constant 388. For example for the MAX_TR_DYNAMIC_RANGE constant 388 of fifteen (15), the clip limits are [−32768, 32767]. If the clip module 620 is applied, then the output of the clip module 620 is the transform coefficients 364 (with each transform coefficient being separately clipped). When the bit-depth is equal to sixteen (16), a signal of twenty-three (23) bits width is clipped into MAX_TR_DYNAMIC_RANGE+1=16 bits (one bit added for the sign). This implies substantial distortion results from setting ENTROPY_CODING_DYNAMIC_RANGE constant to a value such as fifteen (15).

The ENTROPY_CODING_DYNAMIC_RANGE constant may be set sufficiently high that clipping will generally not occur at the maximum supported bit-depth, for example, by setting the ENTROPY_CODING_DYNAMIC_RANGE constant to bit-depth+M+1.

For bit-depths of sixteen (16), the resulting ENTROPY_CODING_DYNAMIC_RANGE constant value is twenty-two (22). Such a setting is appropriate for the QP-prime 624 value of four. For example, with an extreme residual sample array 360 input of a 32×32 block of 16-bit residual samples each having a value of 65535, the resulting DC coefficient value would be 2097120. Although such extreme residual sample array 360 input is less likely when the video encoder 114 is encoding natural captured content, it can be expected when encoding content captured from a screen (e.g. content generated by a computer video card). Sharp changes in brightness aligned to a transform boundary could produce such an extreme residual sample array 360. Increasing the ENTROPY_CODING_DYNAMIC_RANGE constant value increases the range of the transform coefficients 364. The entropy encoder 324 and the entropy decoder 420 are configured to support the range of the transform coefficients 364, resulting in an increase in the 'worst case' to be supported. For a residual coefficient, the 'worst case' is generally the largest magnitude coefficient to be coded, which results in the longest codeword in the encoded bitstream 312. Limiting any increase of the ENTROPY_CODING_DYNAMIC_RANGE constant value is thus beneficial for implementations of the encoder 114 and decoder 134.

The inventors have shown that high PSNRs may be achieved in the video encoder 114 with the bit-depth 390 of sixteen (16) without increasing the MAX_TR_DYNAMIC_RANGE constant 388 as high as previously suggested. Even with the MAX_TR_DYNAMIC_RANGE constant 388 left at the value of fifteen (15), substantial PSNR improvement is achieved through the use of DCTs having a higher DCT_PRECISION. Instead, it is possible to achieve high PSNRs by increasing the precision of the transform matrices in the horizontal DCTs module 502 and the vertical DCTs module 520. The value fifteen (15) for the MAX_TR_DYNAMIC_RANGE constant is already close to the bit-depth 390 of sixteen (16), whereas the DCT_PRECISION constant 392 of value six suggests that considerable refinement in the transform matrix values is possible. In such arrangements of the video encoder 114 and of the video decoder 134, it is beneficial to increase the DCT_PRECISION constant 392 to compensate for the higher magnitude coefficients present in a 'high precision' transform matrix. Moreover, in some arrangements of the video encoder 114 and the video decoder 134 it is possible to set the MAX_TR_DYNAMIC_RANGE constant 388 to a value below the bit-depth 390 plus five (5). For example, a value of seventeen (17) or eighteen (18) may be used for the MAX_TR_DYNAMIC_RANGE constant 388.

Even with the MAX_TR_DYNAMIC_RANGE constant 388 left at the value of fifteen (15), increasing the DCT_PRECISION constant 392 resulted in a substantial increase in the achievable PSNRs. Arrangements of the video encoder 114 and the video decoder 134 where the DCT_PRECISION constant 392 is increased can achieve similar PSNR as arrangements using transform matrices having the DCT_PRECISION constant 392 of six and the MAX_TR_DYNAMIC_RANGE constant 388 set to twenty-one (21). Arrangements of the encoder 114 where the DCT_PRECISION constant 392 result in reduced implementation complexity, because the increase in the DCT_PRECION constant 388 only affects the bus width of intermediate signals, such as the horizontal DCT intermediate output 504 and the vertical DCT intermediate output 522. Most of the data-path is limited to the range of the MAX_TR_DYNAMIC_RANGE constant 388 and thus the incremental circuit size cost is smaller than would otherwise be required.

As previously described, the bus width of the output of the right shift 618 is equal to "bit depth+M+2" bits, which for bit depth=16 results in twenty three (23) bit output width.

Arrangements of the video encoder 114 where the MAX_TR_DYNAMIC_RANGE constant 388 plus one (1) (for the sign bit) has a value less than "bit depth+M+2" exhibit a wider range at the output of the quantiser module 322 than provided at the input to the quantiser module 322. Depending on the provided quantisation parameter 384, the full range may or may not be used. At least for the value of the quantisation parameter 384 corresponding to a QP-prime 624 value of four, "bit depth+M+1" bits are required. When the bit-depth 390 is equal to sixteen (16), this corresponds to the quantisation parameter 384 having a value of −44. For QP-prime 624 values below four, "bit depth+M+2" bits are required.

The quantiser module 322 may be considered as an amplifier having a particular gain. The purpose of the quantiser module 322 is to compress the scaled transform coefficients 362 by down-scaling the coefficients 362 to values of reduced magnitude, in the process discarding the least significant data (i.e. remainder of the divisions inherent in a down-scaling process). The gain of the quantiser module 322 is thus normally less than or equal to one. If the gain of the quantiser module 322 becomes greater than one, then the quantiser module 322 increases the magnitudes of the scaled transform coefficients 362. As no new information has been introduced by the quantiser module 322, such an increase results in reduced compression efficiency of the video encoder 114 and serves no useful purpose. Therefore, the gain of the quantiser module 322 may be limited such that the gain does not exceed one. The point at which the quantiser module 322 exhibits a gain of one is referred to as the 'unity gain' point. The unity gain point is dependent upon the quantisation parameter 384, the bit-depth 390, log 2(nT) 386 and the MAX_TR_DYNAMIC_RANGE constant 388. The gain of the quantiser module 322 is a function of the output of the Quantcoeff module 606 and the right shift amount 626 provided to the right shift module 618.

As previously described, the QUANT_SHIFT constant compensates for the gain inherent in the output of the Quantcoeff module 606 when the QP-prime 624 remainder is equal to four. Additional gain due to the contribution to the right shift amount 626 is from the sum 628. Firstly, considering the case where the QP-prime 624 period is zero, then the sum 628 will be negative for cases where the bit-depth 390 plus log 2(nT) 386 exceed the MAX_TR_DYNAMIC_RANGE constant 388. When the sum 628 is negative, the contribution will be a reduction of the shift amount 626, and thus the overall gain of the quantiser module 322 will exceed unity. When the gain is greater than one, the quantiser module 322 increases the magnitude of the transform coefficients 364. Such an increase is referred to as 'coefficient expansion' and is undesirable as it decreases the coding efficiency achieved by the video encoder 114. Each addition of six to the quantisation parameter 384 results in increasing the QP-prime 610 period by one. Each increase of the QP-prime 610 period halves the gain of the quantiser module 322. Therefore, at higher quantisation parameter 384 values, the gain of the quantiser module 322 is less than one and the coefficient expansion issue does not occur. Yet, for very low values of the quantisation-parameter 384, coefficient expansion can occur.

In one arrangement, the video encoder 114 may use a clip module 614 to clip negative values of the sum 628 to zero while allowing positive values to pass through unchanged (i.e., a "Max(0, sum)" operation), passing on the clipped value to the clipped shift amount 630. Positive values are passed through the clip module 630 unchanged. Each increment of the clipped shift amount 630 causes the right shift module 618 to shift right by one additional bit, halving the gain of the quantiser module 322. The clip module prevents negative values of the clipped shift amount 630. Such negative values would result in left shifting, with each further decrement (i.e. increasing magnitude of the negative value) resulting in a doubling of the gain of the quantiser module 322. The clip module 630 prevents the coefficient expansion issue from occurring. In arrangements of the video encoder 114 using the clip module 614, the output of the quantiser module 322 is limited to MAX_TR_DYNAMIC_RANGE bits (plus one sign bit and plus one additional bit for QP-prime remainder values zero to three). As such, the value of the ENTROPY_CODING_DYNAMIC_RANGE constant may be set according to MAX_TR_DYNAMIC_RANGE bits (plus one sign bit and plus one additional bit for QP-prime remainder values zero to three). Prohibition of gains greater than unity within the quantiser module 322 suggest a particular quantisation parameter 384 value at which the gain of the quantiser module 322 is unity regardless of the transform size (e.g. log 2(nT)) 386. Further decrementing the quantisation parameter 384 value has no effect on the behaviour of the quantiser module 322, suggesting a lower limit on the range of meaningful quantisation parameter 384 values. For a given bit-depth 390, the 'worst case' for the limit of the quantisation parameter 384 occurs at the transform size that results in the highest value for the sum 628. As log 2(nT) has a negative weighting to the sum module 612, the 'worst case' for the limit of the quantisation parameter 384 corresponds to the smallest transform size (4×4, or log 2(nT)=2). Unity gain for all transform sizes is thus achieved when QP-prime 610 period (or 'QP_PRIME_PER') minus the bit-depth 390 minus two plus the MAX_TR_DYNAMIC_RANGE constant 388 is equal to zero. Unity gain for all transform sizes may be expressed as "QP_PRIME_PER−bit-depth−2+MAX_TR_DYNAMIC_RANGE=0".

Substituting the QP-prime 610 period with the quantisation parameter 384 integer divided by six gives "(6*(bit-depth−8)+QP)/6−bit-depth−2+MAX_TR_DYNAMIC_RANGE=0, or QP/6−10+MAX_TR_DYNAMIC_RANGE=0". The minimum value for the quantisation parameter 384 may thus be defined as "6*(10−MAX_TR_DYNAMIC_RANGE)".

As previously discussed, the unity gain point occurs where the QP-prime 624 remainder is equal to four, so a corresponding offset of four may be applied to the minimum to give "6*(10−MAX_TR_DYNAMIC_RANGE)+4". The unity gain point sets a natural lower limit for the quantisation parameter 384, such that the full dynamic range of the quantiser module 322 is available.

In one arrangement, the clip module 614 may be placed after the sum module 616. Such arrangements have a clip threshold of −QUANT_SHIFT instead of zero. The sum module 614 and the sum module 612 may be combined into a single module.

Although the quantiser module 322 was described as containing right shift modules, such as the right shift module 618, some arrangements may also make use of divisions to provide equivalent functionality. Such arrangements compute a divisor according to the right shift amount 626 (or equivalent value).

The complexity of the video encoder 114 may be reduced by using a transform matrix with a corresponding DCT_PRECISION constant 392 higher than six. Such arrangements of the video encoder 114 and the video decoder 134 do not require a substantial increase in the MAX_TR_DYNAMIC_RANGE constant 388 beyond the value of '15' inherent in the high efficiency video coding (HEVC) standard for the Main and Main10 profiles. Moreover, the ENTROPY_CODING_DYNAMIC_RANGE constant may be set equal to the MAX_TR_DYNAMIC_RANGE constant when the clipping module 614 is operable to prevent coefficient expansion within the quantiser module 322. Moreover, a lower limit on the range of the quantisation parameter 384 may be said to exist. Such a limit ensures that required dynamic range at the transform coefficients 364 is not increased due to output from the Quantcoeff module 606 resulting from QP-remainder values from zero to three. As such, once 'unity gain' is reached for the worst-case (smallest) transform size, lower quantisation parameter 384 values may be prohibited.

Figure 7:
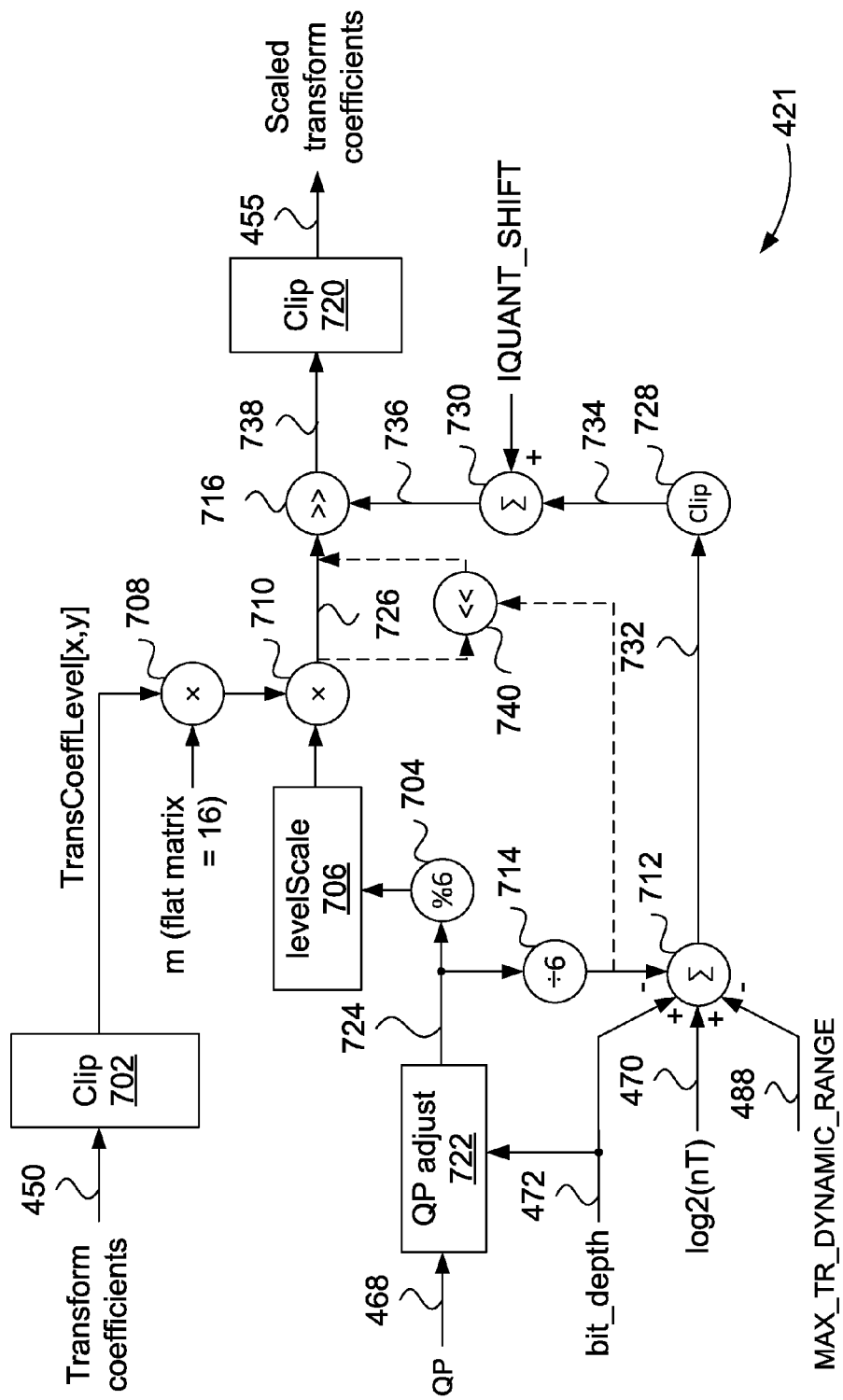
FIG. 7 is a schematic block diagram showing functional modules of a dequantiser module in the video decoder of FIG. 4.

FIG. 7 is a schematic block diagram showing functional modules of the dequantiser module 421 of the video decoder 134. The dequantiser module 326 of the video encoder 114 has substantially the same functionality as the dequantiser module 421. This is necessary because the video encoder 114 needs to be able to construct reference frames identical to those constructed in the video decoder 134, so that the residual sample array 360 is correct (i.e. matching the residual samples of the residual sample array 456 in the video decoder 134). The dequantiser module 421 reverses the reduction in coefficient magnitude introduced by the quantiser module 322. As such, the dequantiser module 421 is provided with a quantisation parameter 468 from the entropy decoder 420. In order to recover the scaled transform coefficients 455 in the video decoder 134, the gain of the dequantiser module 421 is the reciprocal of the gain of the quantiser module 322. Where gains greater than one are undesirable in the quantiser module 322 and are prevented using a clip module 614, corresponding gains of less than one in the dequantiser module 421 need to be prevented, so that the correct magnitudes for the scaled transform coefficients 455 are recovered, regardless of the value of the quantisation parameter. An optional (i.e. non-normative) clip module 702 clips the transform coefficients 450 from the entropy decoder 420 to the range specified by the ENTROPY_CODING_DYNAMIC_RANGE constant. The ENTROPY_CODING_DYNAMIC_RANGE constant is set equal to the value used in the quantiser module 322. The clip module 702 is described as optional as the module 702 is not required by the high efficiency video coding (HEVC) standard, and as such is a 'non-normative clip'. Yet, such a non-normative clip is beneficial as a non-normative clip imposes a limit on the largest possible transform coefficient values required to be decoded by the entropy decoder module 420 and processed by the dequantiser module 421. Moreover, encoded bitstreams produced by the video encoder 114 will not produce residual coefficients that require clipping. Instead, the non-normative clipping simplifies the implementation of the video decoder 134 in handling evil bitstreams, produced by some means other than the video encoder 114 and containing very large magnitude transform coefficients 450.

As with the quantiser module 322, the dequantiser module 421 complexity is dependent on, among other things, the value of the ENTROPY_CODING_DYNAMIC_RANGE constant, with lower values resulting in reduced circuit size and cost. The clip module 702 produces clipped transform coefficients. The clipped transform coefficients are input to a multiplier module 708. The multiplier module 708 enables scaling each clipped transform coefficient in the residual sample array 360 independently, in accordance with a 'quantisation matrix'. Quantisation matrices enable different scaling of each transform coefficient depending on the position of the transform coefficient in the residual sample array 360. The default case is for a 'flat' quantisation matrix, corresponding to a gain that is independent of the position of each transform coefficient in the residual sample array 360. For the default 'flat' case, the multiplier 708 has a gain of sixteen (16), corresponding to a 4-bit shift to the left. The result of the multiplier 708 is passed to a multiplier 710. The multiplier 710 multiplies the result by a value from a levelScale module 706 to produce intermediate transform coefficients 726. As with the quantiser module 322, the gain of the dequantiser module 421 is a geometric progression, but with every increase of the quantisation parameter 468 by six resulting in a doubling of the gain of the dequantiser module 421.

The levelScale module 706 is a table used to provide correct scaling for intermediate quantisation parameter 468 values. The levelScale module 706 is a six entry table having values [40, 45, 51, 57, 64, 72]. One value is selected to output, according to a QP-prime remainder produced by a modulo 6 module 704, taken from a QP-prime 724. The QP-prime 724 is produced by a QP adjust module 722. The QP adjust module 722 operates substantially the same as the QP adjust module 622 of the video encoder 114 as described above. The product of each entry in the levelScale module 706 and the corresponding entry in the Quantcoeff module 606 is approximately two to the power of twenty (20). With appropriate shifting present elsewhere in the quantiser module 322 and the dequantiser module 421, the resulting gains due to QP-prime remainder are reciprocals. A sum module 712 performs part of the calculation to derive a right shift amount 736 (or 'bdShift'). The right shift amount 736 is used by a right shift module 716 to produce unclipped scaled transform coefficients 738 from the intermediate transform coefficients 726. The right shift module 716 operates as described with reference to the right shift module 506 of FIG. 5.

The sum module outputs a sum 732, equal to the log 2(nT) 470 plus the bit-depth 472, with the MAX_TR_DYNAMIC_RANGE constant 488 subtracted and the QP-prime period subtracted. This may be expressed as: SUM=Log 2(nT)+bit-depth−MAX_TR_DYNAMIC_RANGE−QP_per. The sum 732 is passed to a clip module 728. The clip module 728 outputs a clipped sum 734 by clipping positive values of the sum 732 to zero while allowing negative values to pass through unchanged (i.e. a 'Min(0, sum)' operation). The clip module 728 thus prohibits gains of less than a predetermined threshold (one) in the dequantiser module 421. The clipped sum 734 is passed to a sum module 730 which produces the right shift amount 736 by adding a IQUANT_SHIFT constant. The IQUANT_SHIFT constant has a value of ten (10), compensating for the gain introduced by the multiplier modules 708 and 710. The addition of ten to produce the right shift amount 736 is necessary to compensate for the effective left shift of four from the flat quantisation matrix multiplication by sixteen and the effective left shift of six due to the multiplication by sixty-four resulting from QP-prime remainders of four.

Arrangements of the dequantiser module 421 may omit the multiplier module 708 (e.g., when flat quantisation matrices are used). Such arrangements have a IQUANT_SHIFT (as applied at the sum module 730) value of six, as the compensation is for the multiplier module 710. The right shift amount 736 may thus be defined as "IQUANT_SHIFT+Max(0, bit-depth+log 2(nT)−(QP-prime/6)−MAX_TR_DYNAMIC_RANGE)".

Arrangements of the dequantiser module 421 may place the clip module 728 after the sum module 730. Such arrangements alter the threshold (e.g. to −IQUANT_SHIFT instead of zero). Also, the sum module 730 and the sum module 712 may be combined into a single module.

Although the dequantiser module 421 was described as containing right shift modules, such as the right shift module 716, arrangements may also make use of divisions to provide equivalent functionality. Such arrangements compute a divisor according to the right shift amount 736 (or equivalent value).

Arrangements of the dequantiser module 421 according to FIG. 7 are complementary to the quantiser module 322 of FIG. 6. The dequantiser module 421 of FIG. 7 avoids the 'coefficient expansion' issue in the quantiser module 322 and the corresponding 'coefficient contraction' issue in the dequantiser module 421. The dequantiser module 421 of FIG. 7 does not require the dynamic range of the transform coefficients (i.e. ENTROPY_CODING_DYNAMIC_RANGE) to exceed the dynamic range of the scaled transform coefficients (i.e. MAX_TR_DYNAMIC_RANGE) at high bit-depths (e.g. 16). Moreover, the dequantiser module 421 may provide high PSNR at such high bit-depths using a transform of increased precision without the need to increase MAX_TR_DYNAMIC_RANGE to values such as twenty-one (21) or twenty-two (22). The described dequantiser module 421 has reduced bus widths within the video encoder 114 and the video decoder 134, resulting in reduced implementation complexity and/or circuit size.

Arrangements of the dequantiser module 421 may use a left shift module 740 to shift the result of the multiplier module 710 left prior to the right shift module 716. In contrast to the right shift module 716, the left shift module 740 does not introduce any rounding offset. The left shift amount for the left shift module 740 is the QP period, from the module 714. In such arrangements, the QP period is not input to the sum module 712 and thus does not contribute to the input to the clip module 728. The corresponding change may also be made to the quantiser module 322. The result of separating the shift of the QP period is that the rounding offset applied in the right shift module 716 does not compensate for bit shift of the QP period. Such compensation introduces a QP dependent offset into the scaled transform coefficients. For example, a scaled transform coefficient will be equal to the transform coefficient multiplied by the step size, plus a 'step offset'. In some arrangements, the scaled transform coefficient may not include a step offset.

Arrangements of the dequantiser module 421 may use a modified right shift module 716. The modified right shift module 716 applies a reduced rounding offset. The reduction in the rounding offset is by QP period bits. Such reduction avoids the introduction of the step offset into the dequantisation process.

Figure 8:
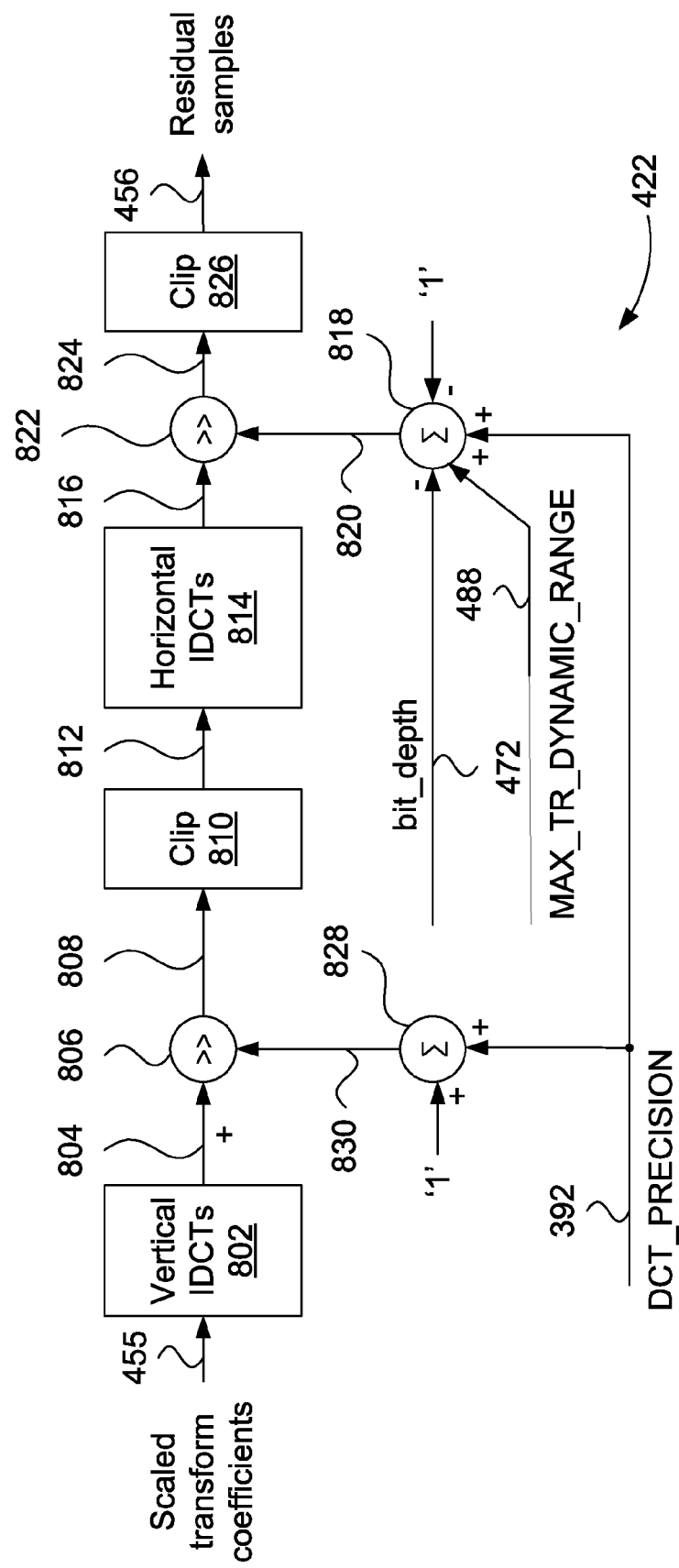
FIG. 8 is a schematic block diagram showing functional modules of an inverse transform module in the video decoder of FIG. 4.

FIG. 8 is a schematic block diagram showing functional modules of the inverse transform module 422 of the video decoder 134 or the inverse transform module 328 of the video encoder 114. An array of scaled transform coefficients 455 are input to vertical IDCT module 802. The vertical IDCT module 802 performs a one-dimensional inverse DCT on each column of the scaled transform coefficients 455, producing vertical IDCT intermediate output 804. As the scaled transform coefficients 455 were normatively clipped according to the MAX_TR_DYNAMIC_RANGE constant 488 in the dequantiser module 421, the dynamic range of the vertical IDCT intermediate output 804 is MAX_TR_DYNAMIC_RANGE+DCT_PRECISION+1 (for the sign bit) bits. The vertical IDCT intermediate output is passed to right shift module 806, which performs a right shift by a right shift amount 830 to produce vertical IDCT output 808. The right shift amount 830 is produced by a sum module 828, which produces DCT_PRECISION plus one bits as output. The right shift amount 830 compensates for gain introduced in the vertical IDCT module 802 due to the transform matrix coefficients. The vertical IDCT output 808 is an array of values having dimensions according to the transform size 470. Each value of the vertical IDCT output 808 has a dynamic range of MAX_TR_DYNAMIC_RANGE+M bits, due to the right shift amount 830. Each value of the vertical IDCT output 808 is normatively clipped by a clip module 810 according to the MAX_TR_DYNAMIC_RANGE constant 488 to produce clipped vertical IDCT output 812. Each value of the clipped vertical IDCT output 812 has a range limited to that implied by the MAX_TR_DYNAMIC_RANGE constant 488. The clipped vertical IDCT output 812 is input to the horizontal IDCT module 814. The horizontal IDCT module 814 performs a one-dimensional inverse transform on each row of the clipped vertical IDCT output 812 to produce horizontal IDCT intermediate output 816.

The horizontal IDCT intermediate output 816 is passed to a right shift module 822, operable in accordance with the above description of the right shift module 506 of FIG. 5. The bus width of each value in the horizontal IDCT intermediate output 816 is equal to one (for the sign) plus the MAX_TR_DYNAMIC_RANGE constant 488 plus the DCT_PRECISION constant 392 plus M. This may be expressed as 1+MAX_TR_DYNAMIC_RANGE+DCT_PRECSION+5.

The right shift module 822 shifts the horizontal IDCT intermediate output 816 by a right shift amount 820 to produce horizontal IDCT output 824. The horizontal IDCT output 824 may be passed to a (non-normative) clip module 826 to produce the residual samples array 456. The residual samples of the residual samples array 456 are added to the samples of the prediction unit (PU) 466 and thus the valid range of the residual samples in the residual samples array 456 is limited to the bit-depth 472 (plus one bit to specify the sign). The right shift amount 820 is produced by a sum module 818. The sum module 818 adds the MAX_TR_DYNAMIC_RANGE constant 488 to the DCT_PRECISION constant 392 and subtracts the bit-depth 472 and a constant of one to produce the right shift amount 820. The right shift amount may thus be expressed as MAX_TR_DYNAMIC_RANGE+DCT_PRECISION−bit depth−1. For the high efficiency video coding (HEVC) standard, the equation simplifies to 20−bit depth. The horizontal IDCT output 824 is an array of unclipped residual samples having a width of "two+M+bit-depth".

FIG. 9 is a schematic flow diagram showing a method 900 of encoding transform coefficients of video data in the video encoder 114. The method 900 encodes transform coefficients, such that the quantisation step does not increase the magnitude of the transform coefficients at sufficiently low quantisation parameter values. The method 900 is thus suitable for low complexity implementations of the video encoder 114 that support high bit-depths and low quantisation parameter operating points. The method 900 may be implemented as part of the video encoder 114, which may, for example, be implemented as hardware (e.g., in an ASIC or an FPGA) or software. The method 900 will be described by way of example where the method 900 is implemented as one or more code modules of the software application program 233 resident with the hard disk drive 210 and being controlled in its execution by the processor 205.

The method 900 begins with a transform residual sample array step 902. At the transform residual array step 902, the processor 205 uses the transform module 320 for transforming the residual sample array 360 into the scaled transform coefficients 362, the scaled transform coefficients having a first dynamic range afforded by the MAX_TR_DYNAMIC_RANGE constant 388. Then at a determine quantiser gain step 904, the processor 205 is used for determining a gain for the quantiser module 322. The gain determined at step 904 may be referred to as a "quantiser gain". As described, the quantiser gain is determined by at least the right shift amount 626. The quantiser gain is determined at step 904 according to at least one of the transform size 386, the bit-depth 390, and the range value represented by the MAX_TR_DYNAMIC_RANGE constant 388 and the quantisation parameter 384, determined in accordance with the above description of FIG. 6, where the clip module 614 is not used. The quantiser gain is a function of the transform size 386, the bit-depth 390, and the range value represented by the MAX_TR_DYNAMIC_RANGE constant 388 and the quantisation parameter 384. If the bit-depth 390 plus the transform size (i.e., log 2(nT) 386) minus the QP-prime 624 period exceeds the MAX_TR_DYNAMIC_RANGE constant 388, then the determined gain may exceed one. In such situations, the coefficient expansion issue is said to arise in the quantiser module 322.

In one arrangement, a determine clipped quantiser gain step 906 may be applied to determine a clipped quantiser gain from the determined quantiser gain based on a predetermined threshold. The predetermined threshold may have a value of one (i.e., unity gain). Arrangements using step 906 prevent the coefficient expansion issue by clipping the determined gain to not exceed the predetermined threshold. Arrangements using step 906 may realise clipping of the determined gain by clipping a right shift amount, such as by using the clip module 614. Notwithstanding the quantiser gain being limited from exceeding the predetermined threshold (e.g. due to the use of the clip module 614), some exceeding of the predetermined threshold by the quantiser gain may result from QP-prime 624 remainder values from zero to three. Such QP-prime 624 remainder values result in output from the Quantcoeff module 606, applied to the multiplier module 606, being greater than two to the power of fourteen (14) (i.e., 16384). QP-prime 624 remainder values from zero to three exceed to compensatory right-shift introduced by the QUANT_SHIFT parameter (equivalent to a division by 16384). An instance of the quantiser gain exceeding the predetermined threshold may be addressed by limiting the lowest permitted quantisation parameter 384 value such as described with reference to FIG. 6.

The method 900 continues at a quantise scaled transform coefficients step 908, where the clipped quantiser gain is applied to the scaled transform coefficients 362, under execution of the processor 205, to produce the transform coefficients 364. The transform coefficients 364 have a second dynamic range defined by the ENTROPY_CODING_DYNAMIC_RANGE. Prevention of the coefficient expansion issue (e.g., through clipping of the right shift amount for the right shift module 614) results in the second dynamic range being less than or equal to the first dynamic range described above. In one arrangement of the encoder 114, the right shift module 618 and the multiplier module 606 may be used to perform the quantise scale transform coefficients step 908. The right shift module 618 and the multiplier module 606 may be used for quantising the scaled transform coefficients 362 according to the determined clipper quantiser gain to produce the transform coefficients 364.

Then at an encode transform coefficients step 910, the entropy encoder 324, under execution of the processor 205, is used for encoding the transform coefficients 364 into the encoded video bitstream 312. The method 900 then completes.

FIG. 10 is a schematic flow diagram showing a method 1000 of decoding an encoded video bitstream using the video decoder 134. The method 1000 is suitable for decoding the encoded bitstream 312 that was produced using the method 900. The method 1000 decodes the bitstream 312 to determine the residual sample array 456 as described above with reference to FIG. 4. The method 1000 determines transform coefficients, such that the quantisation step does not reduce the magnitude of the transform coefficients at sufficiently low quantisation parameter values. The method 1000 is thus suitable for low complexity implementations of the video decoder 134 that support high bit-depths and low quantisation parameter operating points. The method 1000 may be implemented as part of the video decoder 134, which may, for example, be implemented as hardware (e.g., in an ASIC or an FPGA) or software. The method 1000 will be described by way of example where the method 900 is implemented as one or more code modules of the software application program 233 resident with the hard disk drive 210 and being controlled in its execution by the processor 205.

The method 1000 begins with a decode transform coefficients step 1002, where the entropy decoder 420 is used under execution of the processor 205 for decoding the transform coefficients 450 from the encoded bitstream 312. As with the entropy encoder 324, the transform coefficients 450 may be said to have a second dynamic range afforded by the ENTROPY_CODING_DYNAMIC_RANGE constant. Modifications in the video decoder 134 due to prevention of the coefficient expansion issue (e.g., through clipping of the right shift amount for the right shift module 728) results in the second dynamic range being less than or equal to the first dynamic range described above. Then at a determine dequantiser gain step 1004, a gain for the dequantiser module 421 is determined. The gain determined at step 1004 may be referred to as a "dequantiser gain". The dequantiser gain is determined according to at least one of a transform size 470, the bit-depth 472, a range value represented by the MAX_TR_DYNAMIC_RANGE constant 488 and the quantisation parameter 468. Accordingly, the determined dequantiser gain is a function of at least the transform size 470, the bit-depth 472, and the MAX_TR_DYNAMIC_RANGE constant 488 and the quantisation parameter 468, determined in accordance with the above description of FIG. 7, where the clip module 728 is not used. As described above, the dequantiser gain is determined by at least one right shift amount, where the right shift amount may be clipped. If the bit-depth 472 plus the transform size (log 2(nT) 470) minus the QP-prime 724 period exceeds the MAX_TR_DYNAMIC_RANGE constant 488, the determined gain may be less than one. In such situations, the coefficient expansion issue arises in the quantiser module 322 and thus a 'coefficient contraction' issue necessarily occurs in the dequantiser module 421, in order that the correct magnitudes of the scaled transform coefficients 455 are recovered. In one arrangement of the video decoder 134, at a determine clipped dequantiser gain step 1006, the processor 205 may be used for determining a clipped dequantiser gain from the dequantiser gain determined at step 1004. The dequantiser gain is clipped at step 1006 based on a predetermined threshold, such as one (unity gain). Using the determined clipped dequantiser gain step 1006 compensates for the prevented coefficient expansion issue by clipping the determined gain to not be less than the predetermined threshold. Clipping of the determined gain may be implemented by clipping a right shift amount, using the clip module 728. Notwithstanding the dequantiser gain being limited from being less than the predetermined threshold (e.g. due to the use of the clip module 728), some of the determined dequantiser gains may fall below the predetermined threshold as a result of QP-prime 724 remainder values from zero to three. Such values of the QP-prime 724 remainder result in output from the levelScale module 706, applied to the multipler module 710, being less than sixty four (64). Such values of the QP-prime 724 are below the compensatory right-shift introduced by the IQUANT_SHIFT (equal to 7) parameter. The dequantiser gain falling below the predetermined threshold may be addressed by limiting the lowest permitted quantisation parameter 468 value such as described above with reference to FIG. 6.

The method 1000 continues at a dequantise transform coefficients step 1008, where the processor 205 is used for dequantising the transform coefficients 450 according to the determined clipped dequantiser gain to produce scaled transform coefficients 455. In particular, the clipped dequantiser gain is applied to the transform coefficients 450, under execution of the processor 205, to produce the scaled transform coefficients 455. The right shift module 716 and the multiplier modules 708 and 710 may be used to perform the dequantise scale transform coefficients step 1008.

Then at an inverse transform scaled transform coefficients step 1010, the inverse transform module 422 is used for inverse transforming the scaled transform coefficients 455 to produce the residual samples array 456. The method 1000 then completes.

Arrangements of the video encoder 114 and the video decoder 134 may use the clip modules 614 and 728, preventing coefficient expansion, while retaining pre-existing values for the MAX_TR_DYNAMIC_RANGE constant (i.e. 15) and retaining the pre-existing discrete cosine transform (DCT) of the high efficiency video coding standard (HEVC) (i.e. having DCT_PRECISON equal to 6). Arrangements using the clip modules 614 and 728 in such a manner achieve substantially higher coding efficiency under high bit-rate conditions, e.g. bit-depth=16 and QP=−44, although coding efficiency is also improved at other negative QP values and other bit-depths.

The video encoder 114 and a video decoder 134 described herein are operable to encode and decode frame data having a high bit-depth, such as sixteen (16) bits. The described arrangements of the video decoder 134 have reduced hardware complexity or circuit size, owing to the selected value for the MAX_TR_DYNAMIC_RANGE constant 488, the ENTROPY_CODING_DYNAMIC_RANGE constant, the selected transform matrix coefficients and corresponding DCT_PRECISION constant 392. Prevention of the coefficient expansion issue allows the full range of the residual sample array 360 to pass through the transform module 320, the quantiser module 322, the dequantiser module 421 and the inverse transform module 422 without introduction of distortion beyond distortion due to the quantisation step size.

A set of syntax elements known as a 'sequence parameter set' indicates the configuration of the modules in the video decoder 134 required to decode the encoded bitstream 212. One example of the configuration is the bit-depth of the video data encoded in the encoded bitstream 312. The sequence parameter set may be extended with additional syntax elements to indicate the configuration of additional functionality of the modules in the video 134. The syntax elements in the sequence parameter set (and any extensions that are present) are constrained to particular values by the profile of the encoded bitstream 312. Thus, a video decoder can identify from the profile of the video bitstream 312 that it is capable (or is not capable) of decoding the encoded bitstream 312 without having the check each syntax element in the sequence parameter set (or any extensions that are present).

An 'extended precision processing' operation mode is provided for use in specific profiles, such as 'Monochrome 16', 'Main 4:4:4 16 Intra' and 'Main 4:4:4 16 Still Picture'. In other Range extensions profiles, 'extended precision processing' is prohibited. The extended precision processing mode is controlled using a flag ('extended_precision_processing_flag') in an extension to the sequence parameter set known as the 'sequence parameter set range extensions syntax'. When enabled, the processing precision of the transform, quantisation and entropy coding data path width in the video encoder 114, and the corresponding data path widths in the video decoder 134 are also increased, depending on the bit-depth. When enabled, the MAX_TR_DYNAMIC_RANGE constant 488 is set equal to the maximum of either 15 or the result of adding five to the bit-depth signalled in the encoded bitstream 312. Thus, for bit-depths of 8- to 10-bits, the MAX_TR_DYNAMIC_RANGE constant 488 has a value of 15 and for higher bit-depths, the MAX_TR_DYNAMIC_RANGE constant 488 is greater than 15. For example, when the encoded bitstream 312 signals a bit-depth of 16, the MAX_TR_DYNAMIC_RANGE constant 488 has a value of 21. In profiles where extended precision processing is prohibited, MAX_TR_DYNAMIC_RANGE is set to at 15, regardless of the selected bit-depth.

The encoded bitstream 312 may be said to conform to one or more profiles. The set of profiles that the encoded bitstream 312 conforms to is determined by 'constraint flags' in the 'profile level tier' syntax structure of the encoded bitstream 312. Constraint flags indicate the profile(s) to which the encoded bitstream conforms. For example, 'general_max_12 bit_constraint_flag' signals that the set of profiles to which the encoded bitstream 312 conforms excludes all profiles which support bit-depths greater than 12-bits. If 'general_max_12 bit_constraint_flag' is set to zero, then the set of profiles to which the encoded bitstream 312 conforms to excludes all profiles other than the following profiles: 'Monochrome 16', 'Main 4:4:4 16 Intra' and the 'Main 4:4:4 16 Still Picture'. In such a case, the encoded bitstream 312 cannot be considered to conform to profiles such as 'Main 4:4:4 12 Intra' or 'Main 10 Intra'. Other constraint flags may further restrict the set of profiles to which the encoded bitstream 312 conforms.

Then, syntax elements in the sequence parameter set range extensions syntax of the encoded bitstream 312 signal which tools are enabled for use by the video decoder 134 when decoding the encoded bitstream 312. For example, the 'extended_precision_processing_flag' signals the use of increased precision in the inverse transform module 422 in the video decoder 134. The values of the syntax elements in the sequence parameter set and the sequence parameter set range extensions syntax of the encoded bitstream 312 are constrained by the set of profiles to which the encoded bitstream 312 was determined to belong. For example, in the 'Monochrome 16', the 'Main 4:4:4 16 Intra' and the 'Main 4:4:4 16 Still Picture' profiles, the 'extended_precision_processing_flag' is not constrained, i.e. the extended_precision_processing_flag may have a value of either zero ('0') or one ('1') in an encoded bitstream 312 that conforms to these profiles.

In other profiles (e.g. 'Main 4:4:4 12 Intra'), the extended_precision_processing_flag is constrained to always be zero ('0'). Another example are the 'bit_depth_luma_minus8' and 'bit_depth_chroma_minus8' syntax elements. In the 'Main 4:4:4 12 Intra' profile, the 'bit_depth_luma_minus8' and 'bit_depth_chroma_minus8' syntax elements are constrained to have values from zero ('0') to four ('4'), implying that bit-depths from 8- to 12-bits are allowable. In the 'Main 4:4:4 16 Intra' profile, the 'bit_depth_luma_minus8' and 'bit_depth_chroma_minus8' syntax elements are unconstrained by the set of profiles to which the encoded bitstream 312 belongs. In this case, a default constraint of values from zero ('0') to eight ('8') applies, implying that bit-depths from 8- to 16-bits are allowable in the 'Main 4:4:4 16 Intra' profile.

In one arrangement of the video decoder 134, the video decoder 134 that supports more constrained profiles (e.g., 'Main 4:4:4 12 Intra' or 'Main 4:4:4 10 Intra') decodes an encoded bitstream 312 conforming to a less constrained profile (e.g, 'Monochrome 16', 'Main 4:4:4 16 Intra' or 'Main 4:4:4 16 Still Picture'), the encoded bitstream 312 utilising features outside the scope of the profiles supported by the video decoder 134. In particular, the 'extended_precision_processing_flag' in the encoded bitstream 312 is set to one ('1') even though the video decoder 134 is capable of providing compliant decoding of an encoded bitstream 312 where 'extended_precision_processing_flag' is set to zero ('0') and the value of either or both of 'bit_depth_luma_minus8' or 'bit_depth_chroma_minus8' is greater than two ('2'). In such cases, the bit-depth of either or both of luma and chroma channels is greater than 10-bits. When extended precision processing is enabled in the video encoder 114 (as indicated in the encoded bitstream 312), the MAX_TR_DYNAMIC_RANGE constant 388 in the video encoder is greater than fifteen (15). The video decoder 134 does not support profiles for which extended precision processing is enabled and thus does not support operation with the MAX_TR_DYNAMIC_RANGE constant 488 is greater than 15.

In the arrangement of the video decoder 134 that supports more constrained profiles (e.g., 'Main 4:4:4 12 Intra' or 'Main 4:4:4 10 Intra') as described above, the constraint is disregarded and the video encoder 134 decodes the encoded bitstream 312 using the precision afforded by the particular implementation of the video encoder 134 (i.e. MAX_TR_DYNAMIC_RANGE equal to fifteen (15)). In this instance, the video decoder 134 is able to decode the encoded bitstream 312 that conforms to a profile outside of the set of profiles supported by the video decoder 134; however the video decoder 134 does not produce the same output as a different decoder that did conform.

In the arrangement of the video decoder 134 that supports more constrained profiles (e.g., 'Main 4:4:4 12 Intra' or 'Main 4:4:4 10 Intra') as described above, the bit-depth supported by the video decoder 134 may also be less than the bit-depth signalled in the encoded bitstream 212. Further, a reduced bit-depth (e.g, the maximum bit-depth supported by the video decoder 134) is used.

In the arrangement of the video decoder 134 that supports more constrained profiles (e.g., 'Main 4:4:4 12 Intra' or 'Main 4:4:4 10 Intra') as described above, the output of the video decoder 134 approximates the output of a conforming decoder, with a reduction in magnitude corresponding to the reduction in the bit-depth of the video decoder 134 compared to a conforming decoder, which affects the least significant bits. Where the display device 136 supports less bit-depth than the bit-depth used in the encoded bitstream 312, the complexity of the video decoder 134 may be reduced.

Figure 11:
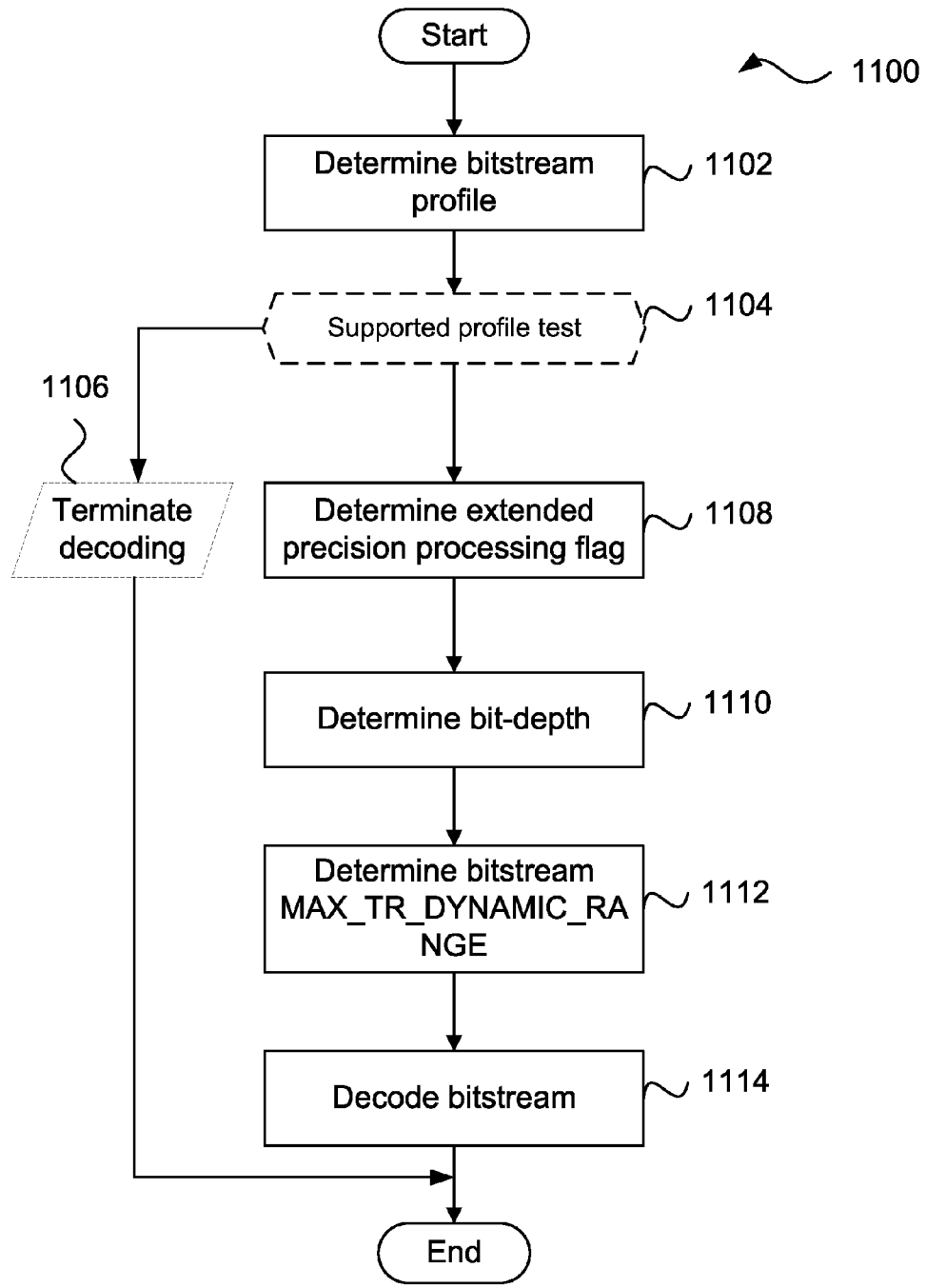
FIG. 11 is a schematic flow diagram showing another method of decoding an encoded bitstream using the video decoder of FIG. 4.

FIG. 11 is a schematic flow diagram showing a method 1100 of decoding an encoded bitstream. The method 1100 is performed in the video decoder 134, under control of the processor 205 using instructions stored in the memory 210. For example, the method 1100 may be implemented as one or more code modules of the software application program 233 resident within the hard disk drive 210 and being controlled in its execution by the processor 205.

When performing the method 1100, the video decoder 134 that supports more constrained profiles (e.g., 'Main 4:4:4 12 Intra' or 'Main 4:4:4 10 Intra') is capable of decoding an encoded bitstream 312 conforming to a less constrained profile (e.g., 'Monochrome 16', 'Main 4:4:4 16 Intra' or 'Main 4:4:4 16 Still Picture'), the encoded bitstream 212 utilising features outside the scope of the profiles supported by the video decoder 134.

At a determine bitstream profile step 1102, the video decoder 134, under control of the processor 205, decodes 'constraint flags' from the profile level tier syntax of the encoded bitstream 312. The processor 205 then uses the decoded constraint flags to determine the profile to which the encoded bitstream 312 conforms.

The method comprises steps 1102, 1108, 1110, 1112 and 1114. However, as seen in FIG. 11, a supported profile test step 1104 (shown in broken lines) and a terminate decoding step 1106 (also shown in broken lines) is shown for the purpose of illustrating the behaviour of a conventional video decoder. The supported profile test step 1104 is described to show the difference between a conventional video decoder and the behaviour of the video decoder 134 when performing the method 1100.

For a conventional video decoder, at the supported profile test step 1104, the video decoder compares the profile of the encoded bitstream 312 as determined at step 1102 with the supported profiles of the conventional video decoder. In a conventional video decoder, if the determined profile of the encoded bitstream 312 was 'higher' or 'less constrained' than the supported profiles of the conventional video decoder, control in the processor 205 would pass to a terminate decoding step 1106. For example, if the constraint flags in the encoded bitstream 312 indicated that the bitstream 312 conformed to the 'Main 4:4:4 16 Intra' profile but that the conventional video decoder did not support the 'Main 4:4:4 16 Intra' profile and did support the 'Main 4:4:4 12 Intra' profile then control passes to a terminate decoding step 1106. In one example, the 'general_max_12 bit_constraint_flag' of the encoded bitstream 312 is set to zero, where the conventional video decoder only conforms decoding of bitstreams where the 'general_max_12 bit_constraint_ flag' flag is set to one.

At terminate decoding step 1106, the video decoder 134, under control of the processor 205, terminates decoding of the encoded bitstream 312. A signal to the user application (i.e. an error message) may be sent to indicate that the encoded bitstream 312 conforms to a profile that the video decoder 134 does not support. The method 1100 then terminates.

However, for the arrangements of the video decoder 134 described above, following step 1104 control in the processor 205 passes to a determine extended precision processing flag step 1108. At the determine extended precision processing flag step 1108, the video decoder 134, under control of the processor 205, decodes the 'extended_precision_processing_flag' syntax element from the encoded bitstream 312. The 'extended_precision_processing_flag' syntax element signals the use of increased precision in the inverse transform module 422 of the video decoder 134.

At a determine bit-depth step 1110, the video decoder 134, under control of the processor 205, decodes the 'bit_depth_luma_minus8' and 'bit_depth_chroma_minus8' syntax elements from the encoded bitstream 312. The result of adding eight to 'bit_depth_luma_minus8' or adding eight to 'bit_depth_chroma_minus8' syntax elements indicate the bit-depth of the luma channel and the chroma channels, respectively.

At a determine bitstream MAX_TR_DYNAMIC_RANGE step 1112, the video decoder 134, under control of the processor 205, determines the value of a MAX_TR_DYNAMIC_RANGE constant. The MAX_TR_DYNAMIC_RANGE constant is determined from the extended_precision_processing_flag and the bit depth of the considered colour channel according to the following formula:

if (extended_precision_processing_flag==1)

MAX_TR_DYNAMIC_RANGE=Max(15, BitDepth+6)

else

MAX_TR_DYNAMIC_RANGE=15, where BitDepth is set equal to the bit-depth of the considered colour channel.

A decoder that supports the 'Main 4:4:4 12 Intra' profile but does not support the 'Main 4:4:4 16 Intra' profile only supports having the MAX_TR_DYNAMIC_RANGE constant 488 equal to fifteen (15). The determined MAX_TR_DYNAMIC_RANGE constant of the step 1112 is greater than fifteen (15) when extended precision processing is enabled and the bit-depth of the considered colour channel is greater than nine (9) bits. For example, if the bit-depth was sixteenth (16), then the corresponding MAX_TR_DYNAMIC_RANGE value would be twenty-one (21). Note that when the bit-depth is configured as ten (10) bits and extended precision processing is disabled, the determined MAX_TR_DYNAMIC_RANGE constant of the step 1112 is fifteen (15), whereas when the bit-depth is configured as ten (10) bits and extended precision processing is enabled, the determined MAX_TR_DYNAMIC_RANGE constant of the step 1112 is sixteen (16).

At a decode bitstream step 1114, the video decoder 134, under control of the processor 205, proceeds to decode the encoded bitstream 312, using the MAX_TR_DYNAMIC_RANGE constant 488 set to a value lower than the value determined at the step 1112. For example, the MAX_TR_DYNAMIC_RANGE constant 488 may be set to a value of fifteen (15), even though a larger value was determined at the step 1112. In an arrangement where the MAX_TR_DYNAMIC_RANGE constant 488 is set to a value lower than the value determined at the step 1112, the output of the video decoder 134 is different to the output expected from a video decoder that does conform to the profile signalled in the encoded bitstream 312. However, the difference in the output of the video decoder 134 is concentrated in the least significant bits of each sample value and thus the video decoder 134 is capable of producing a 'best effort' attempt at decoding the encoded bitstream 312. The result of the best effort attempt at decoding the encoded bitstream 312 is suitable for display on the display device 136 that affords reduced bit-depth compared to the bit-depth of the video source 112. The method 1100 then terminates.

As described above, arrangements of the system 100 (the 'video codec') are configured such that the video encoder 114 and the video decoder 134 use different values of the constant, MAX_TR_DYNAMIC_RANGE. For example, the video decoder 134 may be configured to use MAX_TR_DYNAMIC_RANGE of fifteen (15) and to decode a video bitstream produced by a video encoder 114 configured to use MAX_TR_DYNAMIC_RANGE of a different value, such as twenty-one (21) (if a bit-depth of 16 is used for encoding). In such arrangements, the ENTROPY_CODING_DYNAMIC_RANGE of the video decoder 134 matches the corresponding value in the video encoder 114 to ensure that the full range of coefficient magnitudes present in the encoded bitstream 312 are correctly parsed by the entropy decoder 420 of the video decoder 134.

Arrangements of the system 100 described above permit a 'low complexity' decoder to be used for applications such as video preview or device playback. In particular, applications exist where frame data is captured at a high bit-depth, such as 16-bits, to match the capability of the video source 112 (e.g. an imaging sensor) and encoded into a video bitstream. Preview or device playback requires decoding the video bitstreams where the display device 136 may only support a lower bit-depth (e.g. 8-bits is common for liquid crystal displays (LCDs)). Thus, the video decoder 134 may be implemented to support more constrained (i.e. reduced bit-depth) profiles compared to the profile used in the video encoder 114. Further, the video decoder 134 is decoding an encoded bitstream 312 that was encoded using a profile outside the set of profiles supported by the video decoder 134.

A conventional video decoder 134 is not required to decode an encoded bitstream that was encoded using a profile that the video decoder 134 does not support. However, arrangements of the video decoder 134 described above may produce decoded frames 412 that are a close approximation of the frame data 310, where the bit-depth of the decoded frames 412 may be less than the bit-depth of the frame data. In such arrangements, the ENTROPY_CODING_DYNAMIC_RANGE may differ from MAX_TR_DYNAMIC_RANGE in the video decoder 134. Moreover, the MAX_TR_DYNAMIC_RANGE in the video decoder 134 may differ from the MAX_TR_DYNAMIC_RANGE in the video encoder 114 (i.e., the value may be reduced in the video decoder).

INDUSTRIAL APPLICABILITY

The arrangements described are applicable to the computer and data processing industries and particularly for the digital signal processing for the encoding a decoding of signals such as video signals.

The foregoing describes only some embodiments of the present invention, and modifications and/or changes can be made thereto without departing from the scope and spirit of the invention, the embodiments being illustrative and not restrictive.

In the context of this specification, the word "comprising" means "including principally but not necessarily solely" or "having" or "including", and not "consisting only of". Variations of the word "comprising", such as "comprise" and "comprises" have correspondingly varied meanings.

APPENDIX A

The following text defines a 32×32 matrix of coefficients for an inverse DCT transform having a DCT_PRECISION of 6.

$transMatrix[m][n] = transMatrixCol0$ to $15[m][n]$ with $m = 0 \ldots 15$, $n = 0 \ldots 31 transMatrixCol0$ to $15 =$

{{ 64  64  64  64  64  64  64  64  64  64  64  64  64  64  64  64}

{ 90  90  88  85  82  78  73  67  61  54  46  38  31  22  13   4}

{ 90  87  80  70  57  43  25   9  −9 −25 −43 −57 −70 −80 −87 −90}

{ 90  82  67  46  22  −4 −31 −54 −73 −85 −90 −88 −78 −61 −38 −13}

{ 89  75  50  18 −18 −50 −75 −89 −89 −75 −50 −18  18  50  75  89}

{ 88  67  31 −13 −54 −82 −90 −78 −46  −4  38  73  90  85  61  22}

-continued

{ 87  57   9 −43 −80 −90 −70 −25  25  70  90  80  43  −9 −57 −87}
{ 85  46 −13 −67 −90 −73 −22  38  82  88  54  −4 −61 −90 −78 −31}
{ 83  36 −36 −83 −83 −36  36  83  83  36 −36 −83 −83 −36  36  83}
{ 82  22 −54 −90 −61  13  78  85  31 −46 −90 −67   4  73  88  38}
{ 80   9 −70 −87 −25  57  90  43 −43 −90 −57  25  87  70  −9 −80}
{ 78  −4 −82 −73  13  85  67 −22 −88 −61  31  90  54 −38 −90 −46}
{ 75 −18 −89 −50  50  89  18 −75 −75  18  89  50 −50 −89 −18  75}
{ 73 −31 −90 −22  78  67 −38 −90 −13  82  61 −46 −88  −4  85  54}
{ 70 −43 −87   9  90  25 −80 −57  57  80 −25 −90  −9  87  43 −70}
{ 67 −54 −78  38  85 −22 −90   4  90  13 −88 −31  82  46 −73 −61}
{ 64 −64 −64  64  64 −64 −64  64  64 −64 −64  64  64 −64 −64  64}
{ 61 −73 −46  82  31 −88 −13  90  −4 −90  22  85 −38 −78  54  67}
{ 57 −80 −25  90  −9 −87  43  70 −70 −43  87   9 −90  25  80 −57}
{ 54 −85  −4  88 −46 −61  82  13 −90  38  67 −78 −22  90 −31 −73}
{ 50 −89  18  75 −75 −18  89 −50 −50  89 −18 −75  75  18 −89  50}
{ 46 −90  38  54 −90  31  61 −88  22  67 −85  13  73 −82   4  78}
{ 43 −90  57  25 −87  70   9 −80  80  −9 −70  87 −25 −57  90 −43}
{ 38 −88  73  −4 −67  90 −46 −31  85 −78  13  61 −90  54  22 −82}
{ 36 −83  83 −36 −36  83 −83  36  36 −83  83 −36 −36  83 −83  36}
{ 31 −78  90 −61   4  54 −88  82 −38 −22  73 −90  67 −13 −46  85}
{ 25 −70  90 −80  43   9 −57  87 −87  57  −9 −43  80 −90  70 −25}
{ 22 −61  85 −90  73 −38  −4  46 −78  90 −82  54 −13 −31  67 −88}
{ 18 −50  75 −89  89 −75  50 −18 −18  50 −75  89 −89  75 −50  18}
{ 13 −38  61 −78  88 −90  85 −73  54 −31   4  22 −46  67 −82  90}
{  9 −25  43 −57  70 −80  87 −90  90 −87  80 −70  57 −43  25  −9}
{  4 −13  22 −31  38 −46  54 −61  67 −73  78 −82  85 −88  90 −90}},

*transMatrix*[*m*][*n*] = *transMatrixCol*16 to 31[*m* − 16][*n*] with *m* = 16 ... 31,

*n* = 0 ... 31,

*transMatrixCol*16 to 31 =

{{ 64  64  64  64  64  64  64  64  64  64  64  64  64  64  64  64}
{ −4 −13 −22 −31 −38 −46 −54 −61 −67 −73 −78 −82 −85 −88 −90 −90}
{−90 −87 −80 −70 −57 −43 −25  −9   9  25  43  57  70  80  87  90}
{ 13  38  61  78  88  90  85  73  54  31   4 −22 −46 −67 −87 −90}
{ 89  75  50  18 −18 −50 −75 −89 −89 −75 −50 −18  18  50  75  89}
{−22 −61 −85 −90 −73 −38   4  46  78  90  82  54  13 −31 −67 −88}
{−87 −57  −9  43  80  90  70  25 −25 −70 −90 −80  43   9  57  87}
{ 31  78  90  61   4 −54 −88 −82 −38  22  73  90  67  13 −46 −85}
{ 83  36 −36 −83 −83 −36  36  83  83  36 −36 −83 −83 −36  36  83}
{−38 −88 −73  −4  67  90  46 −31 −85 −78 −13  61  90  54 −22 −82}
{−80  −9  70  87  25 −57 −90 −43  43  90  57 −25 −87 −70   9  80}
{ 46  90  38 −54 −90 −31  61  88  22 −67 −85 −13  73  82   4 −78}
{ 75 −18 −89 −50  50  89  18 −75 −75  18  89  50 −50 −89 −18  75}
{−54 −85   4  88  46 −61 −82  13  90  38 −67 −78  22  90  31 −73}
{−70  43  87  −9 −90 −25  80  57 −57 −80  25  90   9 −87 −43  70}

-continued

{61 73 −46 −82 31 88 −13 −90 −4 90 22 −85 −38 78 54 −67}
{64 −64 −64 64 64 −64 −64 64 64 −64 −64 64 64 −64 −64 64}
{−67 −54 78 38 −85 −22 90 4 −90 13 88 −31 −82 46 73 −61}
{−57 80 25 −90 9 87 −43 −70 70 43 −87 −9 90 −25 −80 57}
{73 31 −90 22 78 −67 −38 90 −13 −82 61 46 −88 4 85 −54}
{50 −89 18 75 −75 −18 89 −50 −50 89 −18 −75 75 18 −89 50}
{−78 −4 82 −73 −13 85 −67 −22 88 −61 −31 90 −54 −38 90 −46}
{−43 90 −57 −25 87 −70 −9 80 −80 9 70 −87 25 57 −90 43}
{82 −22 −54 90 −61 −13 78 −85 31 46 −90 67 4 −73 88 −38}
{36 −83 83 −36 −36 83 −83 36 36 −83 83 −36 −36 83 −83 36}
{−85 46 13 −67 90 −73 22 38 −82 88 −54 −4 61 −90 78 −31}
{−25 70 −90 80 −43 −9 57 −87 87 −57 9 43 −80 90 −70 25}
{88 −67 31 13 −54 82 −90 78 −46 4 38 −73 90 −85 61 −22}
{18 −50 75 −89 89 −75 50 −18 −18 50 −75 89 −89 75 −50 18}
{−90 82 −67 46 −22 −4 31 −54 73 −85 90 −88 78 −61 38 −13}
{−9 25 −43 57 −70 80 −87 90 −90 87 −80 70 −57 43 −25 9}
{90 −90 88 −85 82 −78 73 −67 61 −54 46 −38 31 −22 13 −4}}

End Appendix A.

APPENDIX B

The following C code defines a 32×32 matrix of coefficients for an inverse DCT transform having a DCT_PRECISION of 8.

```
constTMatrixCoeffg_aiT32[32][32] =
    {{256, 256, 256, 256, 256, 256, 256, 256, 256, 256,
    256, 256, 256, 256, 256, 256, 256, 256, 256, 256,
    256, 256, 256, 256, 256, 256, 256, 256, 256, 256, 256, 256},
    {362, 358, 351, 341, 327, 311, 291, 268, 243, 216, 186, 155,
    122, 88, 53, 18, −18, −53, −88, −122, −155, −186, −216,
    −243, −268, −291, −311, −327, −341, −351, −358, −362},
    {360, 346, 319, 280, 230, 171, 105, 35, −35, −105, −171, −230,
    −280, −319, −346, −360, −360, −346, −319, −280, −230,
    −171, −105, −35, 35, 105, 171, 230, 280, 319, 346, 360},
    {358, 327, 268, 186, 88, −18, −122, −216, −291, −341, −362,
    −351, −311, −243, −155, −53, 53, 155, 243, 311, 351, 362,
    341, 291, 216, 122, 18, −88, −186, −268, −327, −358},
    {355, 301, 201, 71, −71, −201, −301, −355, −355, −301,
    −201, −71, 71, 201, 301, 355, 355, 301, 201, 71, −71, −201,
    −301, −355, −355, −301, −201, −71, 71, 201, 301, 355},
    {351, 268, 122, −53, −216, −327, −362, −311, −186, −18,
    155, 291, 358, 341, 243, 88, −88, −243, −341, −358, −291,
    −155, 18, 186, 311, 362, 327, 216, 53, −122, −268, −351},
    {346, 230, 35, −171, −319, −360, −280, −105, 105, 280, 360,
    319, 171, −35, −230, −346, −346, −230, −35, 171, 319, 360,
    280, 105, −105, −280, −360, −319, −171, 35, 230, 346},
    {341, 186, −53, −268, −362, −291, −88, 155, 327, 351, 216,
    −18, −243, −358, −311, −122, 122, 311, 358, 243, 18, −216,
    −351, −327, −155, 88, 291, 362, 268, 53, −186, −341},
    {334, 139, −139, −334, −344, −139, 139, 334, 334, 139, −139,
    −334, −334, −139, 139, 334, 334, 139, −139, −334, −334,
    −139, 139, 334, 334, 139, −139, −334, −334, −139, 139, 334},
    {327, 88, −216, −362, −243, 53, 311, 341, 122, −186, −358,
    −268, 18, 291, 351, 155, −155, −351, −291, −18, 268, 358,
    186, −122, −341, −311, −53, 243, 362, 216, −88, −327},
    {319, 35, −280, −346, −105, 230, 360, 171, −171, −360, −230,
    105, 346, 280, −35, −319, −319, −35, 280, 346, 105, −230,
    −360, −171, 171, 360, 230, −105, −346, −280, 35, 319},
    {311, −18, −327, −291, 53, 341, 268, −88, −351, −243, 122,
    358, 216, −155, −362, −186, 186, 362, 155, −216, −358,
    −122, 243, 351, 88, −268, −341, −53, 291, 327, 18, −311},
    {301, −71, −355, −201, 201, 355, 71, −301, −301, 71, 355,
    201, −201, −355, −71, 301, 301, −71, −355, −201, 201,
    355, 71, −301, −301, 71, 355, 201, −201, −355, −71, 301},
    {291, −122, −362, −88, 311, 268, −155, −358, −53, 327,
    243, −186, −351, −18, 341, 216, −216, −341, 18, 351, 186,
    −243, −327, 53, 358, 155, −268, −311, 88, 362, 122, −291},
```

-continued

{280, −171, −346, 35, 360, 105, −319, −230, 230, 319, −105,
−360, −35, 346, 171, −280, −280, 171, 346, −35, −360,
−105, 319, 230, −230, −319, 105, 360, 35, −346, −171, 280},
{268, −216, −311, 155, 341, −88, −358, 18, 362, 53, −351,
−122, 327, 186, −291, −243, 243, 291, −186, −327, 122,
351, −53, −362, −18, 358, 88, −341, −155, 311, 216, −268},
{256, −256, −256, 256, 256, −256, −256, 256, 256, −256, −256,
256, 256, −256, −256, 256, 256, −256, −256, 256, 256, −256,
−256, 256, 256, −256, −256, 256, 256, −256, −256, 256},
{243, −291, −186, 327, 122, −351, −53, 362, −18, −358, 88,
341, −155, −311, 216, 268, −268, −216, 311, 155, −341,
−88, 358, 18, −362, 53, 351, −122, −327, 186, 291, −243},
{230, −319, −105, 360, −35, −346, 171, 280, −280, −171, 346,
35, −360, 105, 319, −230, −230, 319, 105, −360, 35, 346,
−171, −280, 280, 171, −346, −35, 360, −105, −319, 230},
{216, −341, −18, 351, −186, −243, 327, 53, −358, 155, 268,
−311, −88, 362, −122, −291, 291, 122, −362, 88, 311, −268,
−155, 358, −53, −327, 243, 186, −351, 18, 341, −216},
{201, −355, 71, 301, −301, −71, 355, −201, −201, 355, −71,
−301, 301, 71, −355, 201, 201, −355, 71, 301, −301, −71,
355, −201, −201, 355, −71, −301, 301, 71, −355, 201},
{186, −362, 155, 216, −358, 122, 243, −351, 88, 268, −341,
53, 391, −327, 18, 311, −311, −18, 327, −291, −53, 341,
−268, −88, 351, −243, −122, 358, −216, −155, 362, −186},
{171, −360, 230, 105, −346, 280, 35, −319, 319, −35, −280,
346, −105, −230, 360, −171, −171, 360, −230, −105, 346,
−280, −35, 319, −319, 35, 280, −346, 105, 230, −360, 171},
{155, −351, 291, −18, −268, 358, −186, −122, 341, −311,
53, 243, −362, 216, 88, −327, 327, −88, −216, 362, −243,
−53, 311, −341, 122, 186, −358, 268, 18, −291, 351, −155},
{139, −334, 334, −139, −139, 334, −334, 139, 139, −334, 334,
−139, −139, 334, −334, 139, 139, −334, 334, −139, −139,
334, −334, 139, 139, −334, 334, −139, −139, 334, −334, 139},
{122, −311, 358, −243, 18, 216, −351, 327, −155, −88, 291,
−362, 268, −53, −186, 341, −341, 186, 53, −268, 362, −291,
88, 155, −327, 351, −216, −18, 243, −358, 311, −122},
{105, −280, 360, −319, 171, 35, −230, 346, −346, 230, −35,
−171, 319, −360, 280, −105, −105, 280, −360, 319, −171,
−35, 230, −346, 346, −230, 35, 171, −319, −280, 105},
{88, −243, 341, −358, 291, −155, −18, 186, −311, 362, −327,
216, −53, −122, 268, −351, 351, −268, 122, 53, −216, 327,
−362, 311, −186, 18, 155, −291, 358, −341, 243, −88},
{71, −201, 301, −355, 355, −301, 201, −71, −71, 201, −301,
355, −355, 301, −201, 71, 71, −201, 301, −355, 355, −301,

201, −71, −71, 201, −301, 355, −355, 301, −201, 71},
{53, −155, 243, −311, 351, −362, 341, −291, 216, −122, 18,
88, −186, 268, −327, 358, −358, 327, −268, 186, −88, −18,
122, −216, 291, −341, 362, −351, 311, −243, 155, −53},
{35, −105, 171, −230, 280, −319, 346, −360, 360, −346, 319,
−280, 230, −171, 105, −35, −35, 105, −171, 230, −280, 319,
−346, 360, −360, 346, −319, 280, −230, 171, −105, 35},
{18, −53, 88, −122, 155, −186, 216, −243, 268, −291, 311,
−327, 341, −351, 358, −362, 362, −358, 351, −341, 327,
−311, 291, −268, 243, −216, 186, −155, 122, −88, 53, −18},};

End Appendix B.

APPENDIX C 8.6 Scaling, Transformation and Array Construction Process Prior to Deblocking Filter Process 8.6.1 Derivation Process for Quantization Parameters Input to this process is a luma location (xCb, yCb) specifying the top-left sample of the current luma coding block relative to the top-left luma sample of the current picture.

In this process, the variable QpY, the luma quantization parameter Qp'Y, and the chroma quantization parameters Qp'Cb and Qp'Cr are derived.

The luma location (xQg, yQg), specifies the top-left luma sample of the current quantization group relative to the top left luma sample of the current picture. The horizontal and vertical positions xQg and yQg are set equal to xCb−(xCb & ((1<<Log 2MinCuQpDeltaSize)−1)) and yCb−(yCb & ((1<<Log 2MinCuQpDeltaSize)−1)), respectively. The luma size of a quantization group, Log 2MinCuQpDeltaSize, determines the luma size of the smallest area inside a coding tree block that shares the same qPY_PRED.

The predicted luma quantization parameter qPY_PRED is derived by the following ordered steps:

1. The variable qPY_PREV is derived as follows:
If one or more of the following conditions are true, qPY_PREV is set equal to SliceQpY:
The current quantization group is the first quantization group in a slice.
The current quantization group is the first quantization group in a tile.
The current quantization group is the first quantization group in a coding tree block row and entropy_coding_sync_enabled_flag is equal to 1.
Otherwise, qPY_PREV is set equal to the luma quantization parameter QpY of the last coding unit in the previous quantization group in decoding order.

2. The availability derivation process for a block in z-scan order as specified in subclause 6.4.1 is invoked with the location (xCurr, yCurr) set equal to (xCb, yCb) and the neighbouring location (xNbY, yNbY) set equal to (xQg−1, yQg) as inputs, and the output is assigned to availableA. The variable qPY_A is derived as follows:
If one or more of the following conditions are true, qPY_A is set equal to qPY_PREV:
availableA is equal to FALSE.
the coding tree block address ctbAddrA of the coding tree block containing the luma coding block covering the luma location (xQg−1, yQg) is not equal to CtbAddrinTs, where ctbAddrA is derived as follows:

$x\text{Tmp}=(xQg-1)\text{>>Log 2MinTrafoSize}$ $y\text{Tmp}=yQg\text{>>Log 2MinTrafoSize}$ $\text{minTbAddr}A=\text{MinTbAddrZs}[x\text{Tmp}][y\text{Tmp}]$ $\text{ctbAddr}A=(\text{minTbAddr}A\text{>>}2)*(\text{CtbLog 2Size}Y-\text{Log 2MinTrafoSize})$ (8 255)

Otherwise, qPY_A is set equal to the luma quantization parameter QpY of the coding unit containing the luma coding block covering (xQg−1, yQg).

3. The availability derivation process for a block in z-scan order as specified in subclause 6.4.1 is invoked with the location (xCurr, yCurr) set equal to (xCb, yCb) and the neighbouring location (xNbY, yNbY) set equal to (xQg, yQg−1) as inputs, and the output is assigned to availableB. The variable qPY_B is derived as follows:

If one or more of the following conditions are true, qPY_B is set equal to qPY_PREV:
availableB is equal to FALSE.
the coding tree block address ctbAddrB of the coding tree block containing the luma coding block covering the luma location (xQg, yQg−1) is not equal to CtbAddrinTs, where ctbAddrB is derived as follows:

$x\text{Tmp}=xQg\text{>>Log 2MinTrafoSize}$ $y\text{Tmp}=(yQg-1)\text{>>Log 2MinTrafoSize}$ $\text{minTbAddr}B=\text{MinTbAddrZs}[x\text{Tmp}][y\text{Tmp}]$ $\text{ctbAddr}B=(\text{minTbAddr}B\text{>>}2)*(\text{CtbLog 2Size}Y-\text{Log 2MinTrafoSize})$ (8 256)

Otherwise, qPY_B is set equal to the luma quantization parameter QpY of the coding unit containing the luma coding block covering (xQg, yQg−1).

4. The predicted luma quantization parameter qPY_PRED is derived as follows:

$qPY\_\text{PRED}=(qPY\_A+qPY\_B+1)\text{>>}1$ (8 257)

The variable QpY is derived as follows:

$QpY=((qPY\_\text{PRED}+CuQp\text{DeltaVal}+52+2*QpBd\text{Offset}Y)\%(52+QpBd\text{Offset}Y))-QpBd\text{Offset}Y$ (8 258)

The luma quantization parameter Qp'Y is derived as follows:

$Qp'Y=QpY+QpBd\text{Offset}Y$ (8 259)

The variables qPCb and qPCr are set equal to the value of QpC as specified in Table 89 based on the index qPi equal to qPiCb and qPiCr, respectively, and qPiCb and qPiCr are derived as follows:

$q\text{PiCb}=\text{Clip3}(-QpBd\text{Offset}C, 57, QpY+pps\_cb\_qp\_\text{offset}+slice\_cb\_qp\_\text{offset})$ (8 260)

$q\text{PiCr}=\text{Clip3}(-QpBd\text{Offset}C, 57, QpY+pps\_cr\_qp\_\text{offset}+slice\_cr\_qp\_\text{offset})$ (8 261)

The chroma quantization parameters for the Cb and Cr components, Qp'Cb and Qp'Cr, are derived as follows:

$Qp'Cb=q\text{PCb}+QpBd\text{Offset}C$ (8 262)

$Qp'Cr=q\text{PCr}+QpBd\text{Offset}C$ (8 263)

TABLE 8 9

Specification of QpC as a function of qPi

| qPi | <30 | 30 | 31 | 32 | 33 | 34 | 35 | 36 | 37 | 38 | 39 |
|---|---|---|---|---|---|---|---|---|---|---|---|
|  |  | 40 | 41 | 42 | 43 | >43 |  |  |  |  |  |
| QpC | = qPi | 29 | 30 | 31 | 32 | 33 | 33 | 34 | 34 | 35 |
|  |  | 35 | 36 | 36 | 37 | 37 | = qPi − 6 |  |  |  |  |

8.6.2 Scaling and Transformation Process

Inputs to this process are:
a luma location (xTbY, yTbY) specifying the top-left sample of the current luma transform block relative to the top left luma sample of the current picture,
a variable trafoDepth specifying the hierarchy depth of the current block relative to the coding block,
a variable cIdx specifying the colour component of the current block,
a variable nTbS specifying the size of the current transform block.

Output of this process is the (nTbS)×(nTbS) array of residual samples r with elements r[x][y].
The quantization parameter qP is derived as follows:
If cIdx is equal to 0, $qP=Qp'Y$ (8 264)

Otherwise, if cIdx is equal to 1, $qP=Qp'Cb$ (8 265)

Otherwise (cIdx is equal to 2), $qP=Qp'Cr$ (8 266)

The (nTbS)×(nTbS) array of residual samples r is derived as follows:
If cu_transquant_bypass_flag is equal to 1, the (nTbS)×(nTbS) array r is set equal to the (nTbS)×(nTbS) array of transform coefficients TransCoeffLevel[xTbY][yTbY][cIdx].
Otherwise, the following ordered steps apply:
1. The scaling process for transform coefficients as specified in subclause 8.6.3 is invoked with the transform block location (xTbY, yTbY), the size of the transform block nTbS, the colour component variable cIdx, and the quantization parameter qP as inputs, and the output is an (nTbS)×(nTbS) array of scaled transform coefficients d.
2. The (nTbS)×(nTbS) array of residual samples r is derived as follows:
If transform_skip_flag[xTbY][yTbY][cIdx] is equal to 1, the residual sample array values r[x][y] with x=0 . . . nTbS−1, y=0 . . . nTbS−1 are derived as follows:

$r[x][y]=(d[x][y]\text{<<}7)$ (8 267)

Otherwise (transform_skip_flag[xTbY][yTbY][cIdx] is equal to 0), the transformation process for scaled transform coefficients as specified in subclause 8.6.4 is invoked with the transform block location (xTbY, yTbY), the size of the transform block nTbS, the colour component variable cIdx, and the (nTbS)×(nTbS) array of scaled transform coefficients d as inputs, and the output is an (nTbS)×(nTbS) array of residual samples r.

3. The variable bdShift is derived as follows:

$bd\text{Shift}=\text{DCT\_PRECISION}+\text{MAX\_TR\_DYNAMIC\_RANGE}-1-((c\text{Idx}==0)?\text{BitDepth}Y:\text{BitDepth}C)$ (8 268)

4. The residual sample values r[x][y] with x=0 . . . nTbS−1, y=0 . . . nTbS−1 are modified as follows:

$r[x][y]=(r[x][y]+(1\text{<<}(bd\text{Shift}-1)))\text{>>}bd\text{Shift}$ (8 269)

8.6.3 Scaling Process for Transform Coefficients

Inputs to this process are:

a luma location (xTbY, yTbY) specifying the top-left sample of the current luma transform block relative to the top left luma sample of the current picture, a variable nTbS specifying the size of the current transform block, a variable cIdx specifying the colour component of the current block, a variable qP specifying the quantization parameter.

Output of this process is the (nTbS)×(nTbS) array d of scaled transform coefficients with elements d[x][y].

The variable bdShift is derived as follows:

If cIdx is equal to 0, $$bd\text{Shift}=I\text{QUANT\_SHIFT}+\text{Min}(0, \text{BitDepth}Y+\text{Log}2(n\text{TbS})-(qP/6)-\text{MAX\_TR\_DYNAMIC\_RANGE}) \quad (8\ 270)$$

Otherwise, $$bd\text{Shift}=I\text{QUANT\_SHIFT}+\text{Min}(0, \text{BitDepth}C+\text{Log}2(n\text{TbS})-(qP/6)-\text{MAX\_TR\_DYNAMIC\_RANGE}) \quad (8\ 271)$$

The list levelScale[ ] is specified as levelScale[k]={40, 45, 51, 57, 64, 72} with k=0.5.

For the derivation of the scaled transform coefficients d[x][y] with x=0 . . . nTbS−1, y=0 . . . nTbS−1, the following applies:

The scaling factor m[x][y] is derived as follows:

If scaling_list_enabled_flag is equal to 0, $$m[x][y]=16 \quad (8\ 272)$$

Otherwise (scaling_list_enabled_flag is equal to 1), $$m[x][y]=\text{ScalingFactor}[\text{sizeId}][\text{matrixId}][x][y] \quad (8\ 273)$$

Where sizeId is specified in Table 73 for the size of the quantization matrix equal to (nTbS)×(nTbS) and matrixId is specified in Table 74 for sizeId, CuPredMode[xTbY][yTbY], and cIdx, respectively.

The scaled transform coefficient d[x][y] is derived as follows:

$$d[x][y]=\text{Clip3}(-32768, 32767, ((\text{TransCoeffLevel}[xTbY][yTbY][c\text{Idx}][x][y]*m[x][y]*\text{levelScale}[qP\ \%6]\ \text{<<}\ \cancel{(qP/6)}\ )+(1\text{<<}(bd\text{Shift}-1)))\text{>>}bd\text{Shift}) \quad (8\ 274)$$

8.6.4 Transformation Process for Scaled Transform Coefficients

8.6.4.1 General

Inputs to this process are:

a luma location (xTbY, yTbY) specifying the top-left sample of the current luma transform block relative to the top left luma sample of the current picture, a variable nTbS specifying the size of the current transform block, a variable cIdx specifying the colour component of the current block, an (nTbS)×(nTbS) array d of scaled transform coefficients with elements d[x][y].

Output of this process is the (nTbS)×(nTbS) array r of residual samples with elements r[x][y].

Depending on the values of CuPredMode[xTbY][yTbY], nTbS, and cIdx, the variable trType is derived as follows:

If CuPredMode[xTbY][yTbY] is equal to MODE_INTRA, nTbS is equal to 4, and cIdx is equal to 0, trType is set equal to 1.

Otherwise, trType is set equal to 0.

The (nTbS)×(nTbS) array r of residual samples is derived as follows:

1. Each (vertical) column of scaled transform coefficients d[x][y] with x=0 . . . nTbS−1, y=0 . . . nTbS−1 is transformed to e[x][y] with x=0 . . . nTbS−1, y=0 . . . nTbS−1 by invoking the one-dimensional transformation process as specified in subclause 8.6.4.2 for each column x=0 . . . nTbS−1 with the size of the transform block nTbS, the list d[x][y] with y=0 . . . nTbS−1, and the transform type variable trType as inputs, and the output is the list e[x][y] with y=0 . . . nTbS−1.

2. The intermediate sample values g[x][y] with x=0 . . . nTbS−1, y=0 . . . nTbS−1 are derived as follows:

$$g[x][y]=\text{Clip3}(-32768, 32767, (e[x][y]+64)\text{>>}7) \quad (8\ 275)$$

3. Each (horizontal) row of the resulting array g[x][y] with x=0 . . . nTbS−1, y=0 . . . nTbS−1 is transformed to r[x][y] with x=0 . . . nTbS−1, y=0 . . . nTbS−1 by invoking the one-dimensional transformation process as specified in subclause 8.6.4.2 for each row y=0 . . . nTbS−1 with the size of the transform block nTbS, the list g[x][y] with x=0 . . . nTbS−1, and the transform type variable trType as inputs, and the output is the list r[x ][y] with x=0 . . . nTbS−1.

End Appendix C.

APPENDIX D

8.6 Scaling, Transformation and Array Construction Process Prior to Deblocking Filter Process

8.6.1 Derivation Process for Quantization Parameters

Input to this process is a luma location (xCb, yCb) specifying the top-left sample of the current luma coding block relative to the top-left luma sample of the current picture.

In this process, the variable QpY, the luma quantization parameter Qp'Y, and the chroma quantization parameters Qp'Cb and Qp'Cr are derived.

The luma location (xQg, yQg), specifies the top-left luma sample of the current quantization group relative to the top left luma sample of the current picture. The horizontal and vertical positions xQg and yQg are set equal to xCb−(xCb & ((1<<Log 2MinCuQpDeltaSize)−1)) and yCb−(yCb & ((1<<Log 2MinCuQpDeltaSize)−1)), respectively. The luma size of a quantization group, Log 2MinCuQpDeltaSize, determines the luma size of the smallest area inside a coding tree block that shares the same qPY_PRED.

The predicted luma quantization parameter qPY_PRED is derived by the following ordered steps:

1. The variable qPY_PREV is derived as follows:

If one or more of the following conditions are true, qPY_PREV is set equal to SliceQpY:

The current quantization group is the first quantization group in a slice.

The current quantization group is the first quantization group in a tile.

The current quantization group is the first quantization group in a coding tree block row and entropy_coding_sync_enabled_flag is equal to 1.

Otherwise, qPY_PREV is set equal to the luma quantization parameter QpY of the last coding unit in the previous quantization group in decoding order.

2. The availability derivation process for a block in z-scan order as specified in subclause 6.4.1 is invoked with the location (xCurr, yCurr) set equal to (xCb, yCb) and the neighbouring location (xNbY, yNbY) set equal to (xQg−1, yQg) as inputs, and the output is assigned to availableA. The variable qPY_A is derived as follows:

If one or more of the following conditions are true, qPY_A is set equal to qPY_PREV:
availableA is equal to FALSE.
the coding tree block address ctbAddrA of the coding tree block containing the luma coding block covering the luma location (xQg−1, yQg) is not equal to CtbAddrInTs, where ctbAddrA is derived as follows:

$x\text{Tmp}=(xQg-1)>>\text{Log 2MinTrafoSize}$ $y\text{Tmp}=yQg>>\text{Log 2MinTrafoSize}$ $\text{minTbAddr}A=\text{MinTbAddrZs}[x\text{Tmp}][y\text{Tmp}]$ $\text{ctbAddr}A=(\text{minTbAddr}A>>2)*(\text{CtbLog 2Size}Y-\text{Log 2MinTrafoSize})$ (8 255)

Otherwise, qPY_A is set equal to the luma quantization parameter QpY of the coding unit containing the luma coding block covering (xQg−1, yQg).

3. The availability derivation process for a block in z-scan order as specified in subclause 6.4.1 is invoked with the location (xCurr, yCurr) set equal to (xCb, yCb) and the neighbouring location (xNbY, yNbY) set equal to (xQg, yQg−1) as inputs, and the output is assigned to availableB. The variable qPY_B is derived as follows:

If one or more of the following conditions are true, qPY_B is set equal to qPY_PREV:
availableB is equal to FALSE.
the coding tree block address ctbAddrB of the coding tree block containing the luma coding block covering the luma location (xQg, yQg−1) is not equal to CtbAddrInTs, where ctbAddrB is derived as follows:

$x\text{Tmp}=xQg>>\text{Log 2MinTrafoSize}$ $y\text{Tmp}=(yQg-1)>>\text{Log 2MinTrafoSize}$ $\text{minTbAddr}B=\text{MinTbAddrZs}[x\text{Tmp}][y\text{Tmp}]$ $\text{ctbAddr}B=(\text{minTbAddr}B>>2)*(\text{CtbLog 2Size}Y-\text{Log 2MinTrafoSize})$ (8 256)

Otherwise, qPY_B is set equal to the luma quantization parameter QpY of the coding unit containing the luma coding block covering (xQg, yQg−1).

4. The predicted luma quantization parameter qPY_PRED is derived as follows:

$qPY\_\text{PRED}=(qPY\_A+qPY\_B+1)>>1$ (8 257)

The variable QpY is derived as follows:

$QpY=((qPY\_\text{PRED}+CuQp\text{DeltaVal}+52+2*QpBd\text{Offset}Y)\%(52+QpBd\text{Offset}Y))-QpBd\text{Offset}Y$ (8 258)

The luma quantization parameter Qp'Y is derived as follows:

$Qp'Y=QpY+QpBd\text{Offset}Y$ (8 259)

The variables qPCb and qPCr are set equal to the value of QpC as specified in Table 89 based on the index qPi equal to qPiCb and qPiCr, respectively, and qPiCb and qPiCr are derived as follows:

$qPiCb=\text{Clip3}(-QpBd\text{Offset}C, 57, QpY+pps\_cb\_qp\_\text{offset}+slice\_cb\_qp\_\text{offset})$ (8 260)

$qPiCr=\text{Clip3}(-QpBd\text{Offset}C, 57, QpY+pps\_cr\_qp\_\text{offset}+slice\_cr\_qp\_\text{offset})$ (8 261)

The chroma quantization parameters for the Cb and Cr components, Qp'Cb and Qp'Cr, are derived as follows:

$Qp'Cb=qPCb+QpBd\text{Offset}C$ (8 262)

$Qp'Cr=qPCr+QpBd\text{Offset}C$ (8 263)

TABLE 8 9

Specification of QpC as a function of qPi

| qPi | <30 | 30 | 31 | 32 | 33 | 34 | 35 | 36 | 37 | 38 | 39 |
|---|---|---|---|---|---|---|---|---|---|---|---|
|   | 40 | 41 | 42 | 43 | >43 |   |   |   |   |   |   |
| QpC | = qPi | 29 | 30 | 31 | 32 | 33 | 33 | 34 | 34 | 35 |
|   | 35 | 36 | 36 | 37 | 37 | = qPi − 6 |   |   |   |   |   |

8.6.2 Scaling and Transformation Process

Inputs to this process are:
a luma location (xTbY, yTbY) specifying the top-left sample of the current luma transform block relative to the top left luma sample of the current picture,
a variable trafoDepth specifying the hierarchy depth of the current block relative to the coding block,
a variable cIdx specifying the colour component of the current block,
a variable nTbS specifying the size of the current transform block.

Output of this process is the (nTbS)×(nTbS) array of residual samples r with elements r[x][y].

The quantization parameter qP is derived as follows:
If cIdx is equal to 0, $qP=Qp'Y$ (8 264)

Otherwise, if cIdx is equal to 1, $qP=Qp'Cb$ (8 265)

Otherwise (cIdx is equal to 2), $qP=Qp'Cr$ (8 266)

The (nTbS)×(nTbS) array of residual samples r is derived as follows:
If cu_transquant_bypass_flag is equal to 1, the (nTbS)×(nTbS) array r is set equal to the (nTbS)×(nTbS) array of transform coefficients TransCoeffLevel[xTbY][yTbY][cIdx].
Otherwise, the following ordered steps apply:
1. The scaling process for transform coefficients as specified in subclause 8.6.3 is invoked with the transform block location (xTbY, yTbY), the size of the transform block nTbS, the colour component variable cIdx, and the quantization parameter qP as inputs, and the output is an (nTbS)×(nTbS) array of scaled transform coefficients d.
2. The (nTbS)×(nTbS) array of residual samples r is derived as follows:
If transform_skip_flag[xTbY][yTbY][cIdx] is equal to 1, the residual sample array values r[x][y] with x=0 ... nTbS−1, y=0 ... nTbS−1 are derived as follows:

$r[x][y]=(d[x][y]<<7)$ (8 267)

Otherwise (transform_skip_flag[xTbY][yTbY][cIdx] is equal to 0), the transformation process for scaled transform coefficients as specified in subclause 8.6.4 is invoked with the transform block location (xTbY, yTbY), the size of the transform block nTbS, the colour component variable cIdx, and the (nTbS)×(nTbS) array of scaled transform coefficients d as inputs, and the output is an (nTbS)×(nTbS) array of residual samples r.

3. The variable bdShift is derived as follows:

bdShift=DCT_PRECISION+MAX_TR_DYNAMIC_RANGE−1−((cIdx==0)?BitDepthY:BitDepthC)  (8 268)

4. The residual sample values r[x][y] with x=0 . . . nTbS−1, y=0 . . . nTbS−1 are modified as follows:

r[x][y]=(r[x][y]+(1<<(bdShift−1)))>>bdShift  (8 269)

8.6.3 Scaling Process for Transform Coefficients
Inputs to this process are:
a luma location (xTbY, yTbY) specifying the top-left sample of the current luma transform block relative to the top left luma sample of the current picture,
a variable nTbS specifying the size of the current transform block,
a variable cIdx specifying the colour component of the current block,
a variable qP specifying the quantization parameter.
Output of this process is the (nTbS)×(nTbS) array d of scaled transform coefficients with elements d[x][y].
The variable bdShift is derived as follows:
If cIdx is equal to 0, bdShift=IQUANT_SHIFT+Min(0, BitDepthY+Log2(nTbS)−MAX_TR_DYNAMIC_RANGE)  (8 270)

Otherwise, bdShift=IQUANT_SHIFT+Min(0, BitDepthC+Log2(nTbS)−MAX_TR_DYNAMIC_RANGE)  (8 271)

The list levelScale[ ] is specified as levelScale[k]={40, 45, 51, 57, 64, 72} with k=0 . . . 5.
For the derivation of the scaled transform coefficients d[x][y] with x=0 . . . nTbS−1, y=0 . . . nTbS−1, the following applies:
The scaling factor m[x][y] is derived as follows:
If scaling_list_enabled_flag is equal to 0, m[x][y]=16  (8 272)

Otherwise (scaling_list_enabled_flag is equal to 1), m[x][y]=ScalingFactor[sizeId][matrixId][x][y]  (8 273)

Where sizeId is specified in Table 73 for the size of the quantization matrix equal to (nTbS)×(nTbS) and matrixId is specified in Table 7 4 for sizeId, CuPredMode[xTbY][yTbY], and cIdx, respectively.
The scaled transform coefficient d[x][y] is derived as follows:

d[x][y]=Clip3(−32768, 32767, ((TransCoeffLevel[xTbY][yTbY][cIdx][x][y]*m[x][y]* levelScale[qP %6]<<(qP/6))+(1<<(bdShift−1)))>>bdShift)  (8 274)

8.6.4 Transformation Process for Scaled Transform Coefficients
8.6.4.1 General
Inputs to this process are:
a luma location (xTbY, yTbY) specifying the top-left sample of the current luma transform block relative to the top left luma sample of the current picture,
a variable nTbS specifying the size of the current transform block,
a variable cIdx specifying the colour component of the current block,
an (nTbS)×(nTbS) array d of scaled transform coefficients with elements d[x][y].
Output of this process is the (nTbS)×(nTbS) array r of residual samples with elements r[x][y].
Depending on the values of CuPredMode[xTbY][yTbY], nTbS, and cIdx, the variable trType is derived as follows:

If CuPredMode[xTbY][yTbY] is equal to MODE_INTRA, nTbS is equal to 4, and cIdx is equal to 0, trType is set equal to 1.
Otherwise, trType is set equal to 0.
The (nTbS)×(nTbS) array r of residual samples is derived as follows:
1. Each (vertical) column of scaled transform coefficients d[x][y] with x=0 . . . nTbS−1, y=0 . . . nTbS−1 is transformed to e[x][y] with x=0 . . . nTbS−1, y=0 . . . nTbS−1 by invoking the one-dimensional transformation process as specified in subclause 8.6.4.2 for each column x=0 . . . nTbS−1 with the size of the transform block nTbS, the list d[x][y] with y=0 . . . nTbS−1, and the transform type variable trType as inputs, and the output is the list e[x][y] with y=0 . . . nTbS−1.
2. The intermediate sample values g[x][y] with x=0 . . . nTbS−1, y=0 . . . nTbS−1 are derived as follows:

g[x][y]=Clip3(−32768, 32767, (e[x][y]+64)>>7)  (8 275)

3. Each (horizontal) row of the resulting array g[x][y] with x=0 . . . nTbS−1, y=0 . . . nTbS−1 is transformed to r[x][y] with x=0 . . . nTbS−1, y=0 . . . nTbS−1 by invoking the one-dimensional transformation process as specified in subclause 8.6.4.2 for each row y=0 . . . nTbS−1 with the size of the transform block nTbS, the list g[x][y] with x=0 . . . nTbS−1, and the transform type variable trType as inputs, and the output is the list r[x][y] with x=0 . . . nTbS−1.
End Appendix D.

The claims defining the invention are as follows:

1. A method of decoding a bit-stream of encoded video data in a video decoder using a codec, the method comprising:
determining if the bit-stream of encoded video data has extended precision processing enabled and has a bit-depth greater than nine bits, when a profile of the bit-stream of the encoded video data is determined to be unsupported by the video decoder using the codec, the encoded video data being encoded using the codec; and
applying a profile supported by the video decoder to the bit-stream to decode the bit-stream using the codec, the bit-stream having an unsupported profile of the codec and being decoded using the supported profile of the decoder, if the bit-stream has extended precision processing enabled and a bit depth greater than nine (9) bits, the decoded video data having differences to the video data encoded in the bit-stream due to the unsupported profile being different to the supported profile.

2. The method according to claim 1, wherein the unsupported profile is Monochrome 16.

3. The method according to claim 1, wherein the unsupported profile is Main 4:4:4 16 Intra.

4. The method according to claim 1, wherein the unsupported profile is Main 4:4:4 16 Still Picture.

5. The method according to claim 1, wherein the encoded video data has a transform dynamic range greater than fifteen (15) and the video decoder supports a transform dynamic range of fifteen (15).

6. The method according to claim 1, wherein the differences between the decoded video data and the video data encoded in the bit-stream is in least significant bits of sample values in the bit-stream.

7. The method according to claim 1, wherein the codec is high efficiency video coding.

8. A system for decoding a bit-stream of encoded video data in a video decoder using a codec, the system comprising:

a memory for storing data and a computer program;

a processor coupled to the memory for executing the computer program, the computer program comprising instructions for:

determining if the bit-stream of encoded video data has extended precision processing enabled and has a bit-depth greater than nine bits, when a profile of the bit-stream of the encoded video data is determined to be unsupported by the video decoder using the codec, the encoded video data being encoded using the codec; and applying a profile supported by the video decoder to the bit-stream to decode the bit-stream using the codec, the bit-stream having an unsupported profile of the codec and being decoded using the supported profile of the decoder, if the bit-stream has extended precision processing enabled and a bit depth greater than nine (9) bits, the decoded video data having differences to the video data encoded in the bit-stream due to the unsupported profile being different to the supported profile.

9. An apparatus for decoding a bit-stream of encoded video data in a video decoder using a codec, the apparatus comprising:

determining module for determining if the bit-stream of encoded video data has extended precision processing enabled and has a bit-depth greater than nine bits, when a profile of the bit-stream of the encoded video data is determined to be unsupported by the video decoder using the codec, the encoded video data being encoded using the codec; and decoding module for applying a profile supported by the video decoder to the bit-stream to decode the bit-stream using the codec, the bit-stream having an unsupported profile of the codec and being decoded using the supported profile of the decoder, if the bit-stream has extended precision processing enabled and a bit depth greater than nine (9) bits, the decoded video data having differences to the video data encoded in the bit-stream due to the unsupported profile being different to the supported profile.

10. A non-transitory computer readable medium having a computer program stored on the medium for decoding a bit-stream of encoded video data in a video decoder using a codec, the program comprising:

code for determining if the bit-stream of encoded video data has extended precision processing enabled and has a bit-depth greater than nine bits, when a profile of the bit-stream of the encoded video data is determined to be unsupported by the video decoder using the codec, the encoded video data being encoded using the codec; and code for applying a profile supported by the video decoder to the bit-stream to decode the bit-stream using the codec, the bit-stream having an unsupported profile of the codec and being decoded using the supported profile of the decoder, if the bit-stream has extended precision processing enabled and a bit depth greater than nine (9) bits, the decoded video data having differences to the video data encoded in the bit-stream due to the unsupported profile being different to the supported profile.

* * * * *